United States Patent [19]

Kilner et al.

[11] Patent Number: 4,482,961
[45] Date of Patent: Nov. 13, 1984

[54] AUTOMATIC CONTROL SYSTEM FOR DIRECTIONAL CONTROL OF AN AIRCRAFT DURING LANDING ROLLOUT

[75] Inventors: Jerome R. Kilner, Bellevue; Steven M. Warren, Seattle, both of Wash.

[73] Assignee: The Boeing Company, Seattle, Wash.

[21] Appl. No.: 303,381

[22] Filed: Sep. 18, 1981

[51] Int. Cl.³ .......................................... G06F 15/00
[52] U.S. Cl. ................... 364/428; 364/430; 244/183; 318/586; 318/583
[58] Field of Search ............... 364/428, 427, 430; 244/50, 179, 183, 189, 184, 191, 81, 100 R, 108; 340/27 R, 27 NA, 583–586; 73/178 R, 178 T

[56] References Cited

U.S. PATENT DOCUMENTS

| | | | |
|---|---|---|---|
| 3,761,691 | 9/1973 | Schultz et al. | 364/428 |
| 3,837,603 | 9/1974 | Schultz et al. | 318/586 |
| 4,006,870 | 2/1977 | Boone et al. | 364/428 |
| 4,094,479 | 6/1978 | Kennedy, Jr. | 318/586 |

Primary Examiner—Errol A. Krass
Assistant Examiner—Thomas G. Black
Attorney, Agent, or Firm—Christensen, O'Connor, Johnson & Kindness

[57] ABSTRACT

A control system for maintaining an aircraft within the lateral boundaries of a runway during landing rollout under conditions of combined crosswind and low runway friction is disclosed. An automatic mode of operation is provided wherein the system utilizes an input signal representative of the heading of the runway being utilized and signals provided by (or derivable from) an inertial navigation system to exercise coordinated control of the aircraft rudder, steering and differential braking system. In a semiautomatic mode of operation, signals supplied by the inertial navigation system (or its equipment) are utilized in conjunction with a continuous command signal that is provided by the pilot to indicate the desired aircraft trajectory. An optional provision is included for limiting the aircraft ground velocity slip angle to a range wherein an increase in ground velocity slip angle results in increased lateral corrective force on the aircraft. An additional optional provision modifies operation of the brake-antiskid system employed by the aircraft so as to reduce braking pressure by an amount that substantially optimizes lateral corrective force on the aircraft.

29 Claims, 15 Drawing Figures

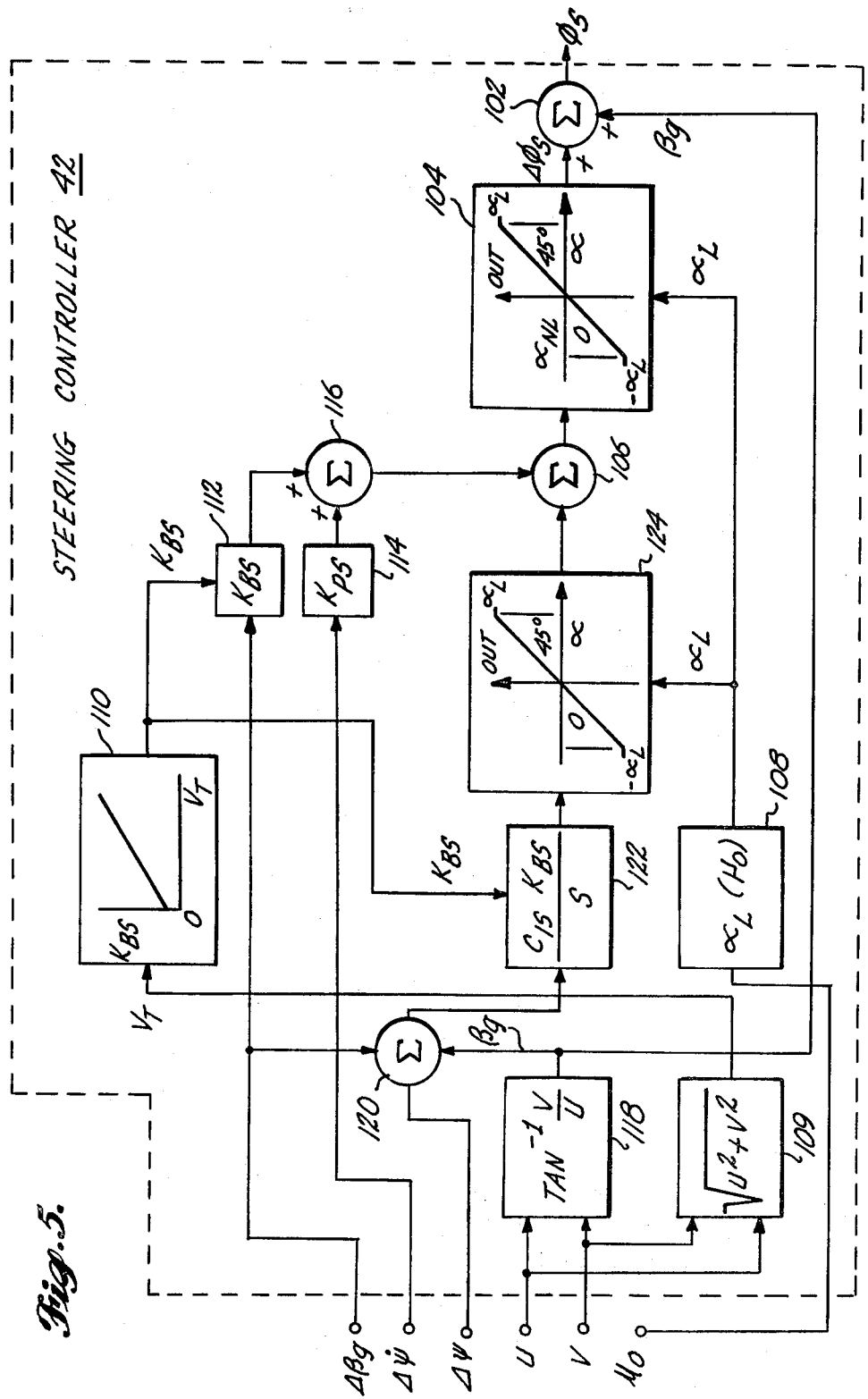

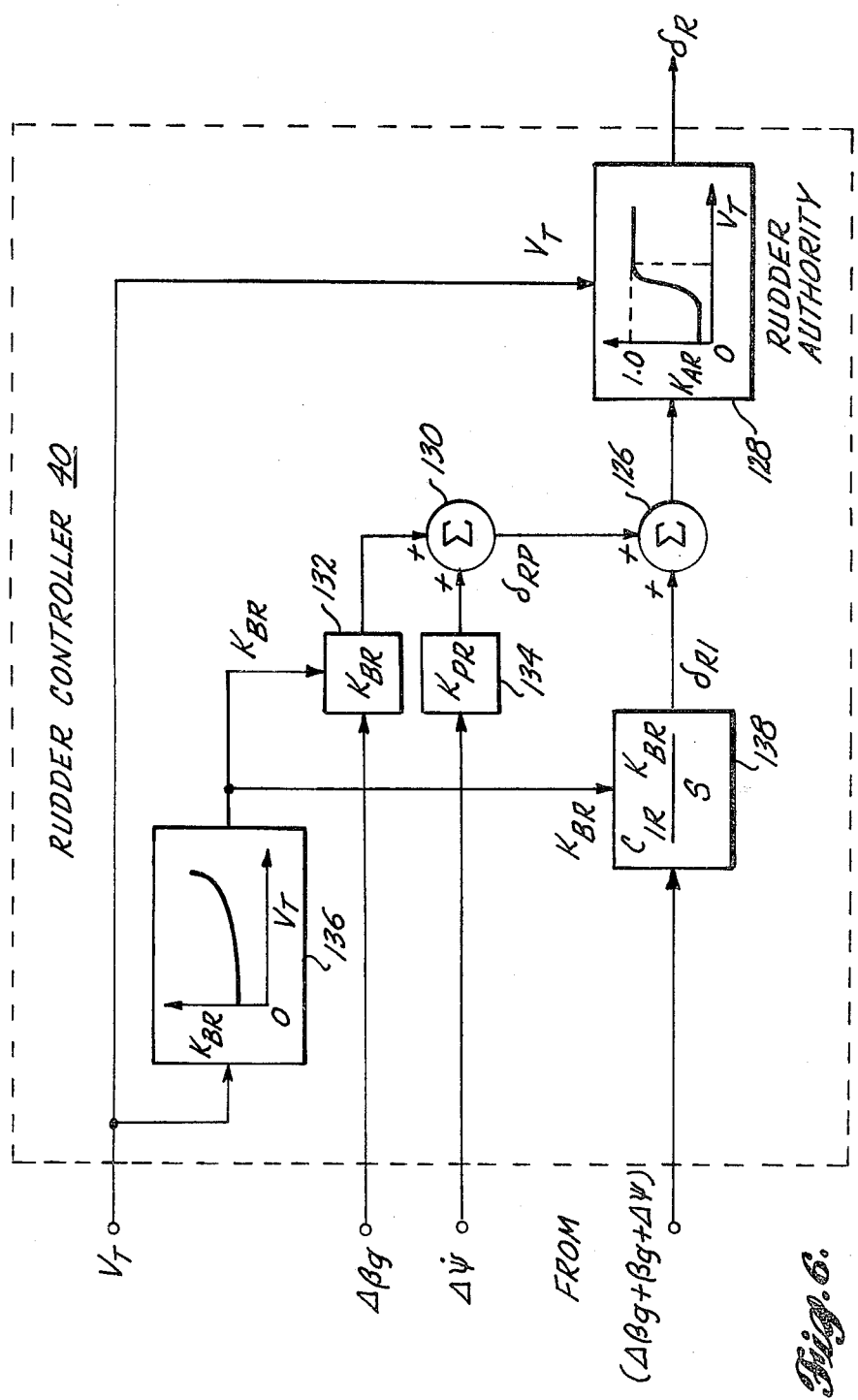

AUTOMATIC CONTROL SYSTEM FOR DIRECTIONAL CONTROL OF AN AIRCRAFT DURING LANDING ROLLOUT

BACKGROUND OF THE INVENTION

This invention relates to methods and apparatus for directional control of an aircraft during landing rollout (i.e., during the ground portion of the landing procedure wherein the aircraft decelerates from the touchdown velocity to a taxi or turn-out speed). More specifically, this invention relates to automatic control systems and methods utilized therein for maintaining an aircraft within the lateral boundaries of a runway when a crosswind landing is executed on a runway that exhibits reduced frictional properties because of environmental factors such as rain, snow or ice or because of other deleterious runway conditions or, in some cases, on runways of less than the customary width.

As is well known in the art, crosswinds and adverse conditions that reduce the coefficient of friction exhibited by the runway surface often interfere with or limit the operation of both military and commercial aircraft. In particular, depending on the severity of the crosswind and the runway conditions, the width of the runway, the type of aircraft involved, and various other factors, it may be impossible to land at an intended destination while maintaining adequate safety margins. In such a situation, the aircraft often must be diverted to an alternate landing site or its landing delayed until wind and/or runway conditions improve to a point that a landing attempt is well within the operational capabilities of the aircraft and its crew. Needless to say the resulting delays and diversions are costly in terms of fuel and time expended and can cause interruptions in scheduled aircraft operation as well as interference with the tactical deployment of military aircraft.

Several factors contribute to the problem of maintaining directional control when executing a crosswind landing on a surface having a relatively low coefficient of friction. First, in order to achieve a relatively straight-in landing approach, the aircraft must be flown at a particular crab angle or flown with the windward wing down so as to establish aerodynamic slip. Often times the pilot must make corrections during the final phases of a landing approach to account for changes in the aerodynamic state of the aircraft such as those resulting from crosswind variations, increasing ground effects or other environmental factors. In addition, a de-crabbing or reduction of aerodynamic slip maneuver is generally executed immediately prior to touchdown in an attempt to align the aircraft with the centerline of the runway as the landing rollout is initiated. If these maneuvers are not properly executed, a rather complicated sequence of precise control actions may be required to maintain the aircraft on the runway. Moreover, even if the aircraft touches down properly and the pilot and crew are aware of runway conditions prior to landing, maintaining directional control at touchdown and during the initial phase of the landing rollout requires that the aircraft pilot anticipate the positional perturbations and effects of several factors and forces including the crosswind and pilot asserted commands to the aircraft rudder, steering and braking systems. Because of the relatively high landing speed of most modern aircraft, the pilot has little time to institute a control action during the initial phase of landing rollout (primarily operation of the rudder) and little time is available to evaluate the results of an asserted control action and institute any required corrective measure. Thus, a consideration of only those factors that influence directional control at touchdown and during the initiation of the landing rollout reveals several restrictions and limitations that have prevented modern high speed aircraft from attaining true all-weather operating capability.

Further, even though the landing roll begins in a manner which allows adequate initial directional control and guidance of the aircraft within the lateral boundaries of the runway, it can be difficult to maintain directional stability as the aircraft is decelerated to a speed at which it can be turned off the runway and stopped in the desired manner. In this regard, as the aircraft decelerates the aerodynamically generated lift forces rapidly decrease and the weight of the aircraft is transferred to the landing gear. As aircraft velocity decreases, the yawing moment and lateral force produced by a given amount of rudder deflection decreases thereby lessening the directional control available through operation of the rudder until a speed is reached wherein the rudder is substantially ineffective in steering the aircraft along the runway. Since the transfer of weight to the aircraft landing gear that accompanies deceleration increases the directional control capability of the aircraft nose wheel, or other steerable portion of the landing gear, directional stability and control can be maintained by simultaneously controlling the rudder and aircraft steering while the aircraft passes through the midrange or transitional velocity portion of the landing roll. As is the case with the initial, high speed portion of the sequence, the pilot's reaction time and inability to rapidly determine and assert the exact control required with unerring accuracy has limited crosswind landings to situations wherein the combined crosswind and runway surface condition permits rather wide margins of error.

The difficulties encountered in crosswind landings on relatively narrow runways or a runway of substantially reduced surface friction does not end as the aircraft brakes to a relatively low speed. In particular, the heavy braking and, in some cases, wheel lock-up that occurs during this phase of the landing rollout substantially reduces the frictional contact force between the aircraft tires and the runway surface. This decreases the lateral force capability of the landing gear thereby rendering the aircraft even more susceptible to lateral displacement under the force of crosswinds. Moreover, employment of various conventional deceleration devices such as thrust reversers and drag chutes have a marked tendency to cause the aircraft to yaw into the wind (i.e., "weathervane"). Thus, employment of such devices during a crosswind landing procedure on a runway that is exceptionally narrow or slippery present further and compounded control problems.

Most prior art attempts to deal with the numerous problems associated with executing a crosswind landing have been limited to the airborne portion of the landing sequence and, in particular, to generating command signals which direct the pilot (or autopilot system) to execute maneuvers immediately prior to touchdown that will align the aircraft with the runway centerline. In addition to such attempts, which are of no assistance relative to steering the aircraft during the landing rollout, the prior art includes an apparently limited number of proposals for automatically controlling one or more aspects of the landing rollout sequence. For example, U.S. Pat. Nos. 2,762,006 and 2,762,007, which issued to A. W. Blanchard, disclose a system wherein control over the aircraft ground roll trajectory is primarily based on rudder control during high speed portions of the landing rollout and on control of the steerable wheels of the aircraft during the lower speed portions of the sequence. Such prior art may prove satisfactory relative to assisting the pilot during landing rollout under typical landing conditions, but cannot and does not include provisions for exercising the precise control over the aircraft rudder, steering and braking systems that is required under combined conditions of crosswind and relatively low coefficient of runway surface friction (i.e., runways that are wet or coated with snow or ice).

Further prior art proposals such as U.S. Pat. No. 4,006,870, issued to Boone et al, for guiding an aircraft through the landing rollout sequence are not only limited to crosswind landings on relatively normal runway surfaces, but can only be used on the airfields equipped with special radio equipment. In particular, such systems utilize localizer signals similar to those employed in generating the localizer signal of a conventional in-bound landing system (ILS).

Accordingly, it is an object of this invention to provide a ground roll control system which is useful during execution of a cross wind landing on a runway of relatively low surface friction or an extremely narrow runway.

Further, and more specifically, it is an object of this invention to provide a control system which coordinates rudder, steering and brake operation to achieve substantially improved directional stability and control throughout all phases of a landing rollout under conditions of cross wind and reduced runway surface friction which lie outside the operational capabilities of an aircraft equipped with a prior art landing control systems.

It is an additional object of this invention to provide a landing rollout control system of the above-mentioned type which does not require ground-generated localizer signals or any other specialized ground-based equipment.

SUMMARY OF THE INVENTION

In accordance with this invention, aircraft position and velocity signals that are generated by an inertial navigation system or other such devices that are commonly included in the electronic equipment of a high speed, high performance aircraft are utilized to generate control signals that provide precise and coordinated control of the aircraft rudder, steering and braking systems to assist in maintaining the aircraft on the runway during execution of crosswind landings on runway surfaces of relatively narrow width and/or relatively low surface friction. In this regard, each embodiment of the present invention generates rudder, steering and braking signals that cooperatively interact so that: (a) the aircraft rudder is the primary lateral control mechanism at touchdown and during the initial portion of the landing rollout sequence wherein the aircraft travels at a relatively high speed; (b) both rudder and steering control signals are generated during an intermediate speed portion of the landing rollout sequence wherein the rudder begins to lose effectiveness as a means of lateral control and the aircraft steering system becomes more effective as the weight of the aircraft is transferred to the aircraft landing gear; and (c) differential braking signals are generated to supplement the rudder and steering control signals if the aircraft is travelling at a relatively low speed and the rudder and steering control signals are not sufficient to cause the necessary corrective action.

In the practice of this invention, the rudder, steering and differential braking control signals are based on a ground roll course error signal and inertial navigation signals which define the longitudinal and lateral components of aircraft ground velocity and the aircraft yaw position. When operated in a semiautomatic mode of operation, a system configured in accordance with this invention develops the ground roll course error signal (denoted $\Delta\beta_g$) by comparing a directional command signal that is generated by operation of the aircraft rudder pedals or other "aiming" means with the actual or current ground velocity slip angle (i.e., the angle between the longitudinal body axis of the aircraft and the aircraft ground track velocity). During operation in an automatic mode, the ground roll course error signal ($\Delta\beta_g$) is computed by a course error computer or other sequential logic device on the basis of the heading of the runway being utilized, the current ground velocity slip angle, the yaw position of the aircraft and a predetermined system constant which corresponds to a desired intercept of the aircraft with the runway centerline. In this automatic mode, the pilot does not actively steer the aircraft during the landing rollout sequence, however, he or she can provide minor course trim adjustment if the information provided to the invention is not entirely accurate and causes the aircraft to slowly drift away from the center of the runway.

Regardless of whether a landing rollout control system of this invention is being operated in the semiautomatic or automatic mode, the rudder control signal is generated on the basis of the ground roll course error signal ($\Delta\beta_g$), the current ground velocity slip angle (denoted herein as $\beta_g$), the time rate of change in yaw (denoted herein as $\Delta\dot{\psi}$) and the yaw angle of the aircraft relative to the centerline of the runway (denoted as $\Delta\psi$). More specifically, the rudder control signal of this invention can be expressed mathematically as $\delta_R = K_{AR}(\delta_{RP} + \delta_{RI})$, where $K_{AR}$ is a scale factor that "washes out" the rudder control signal during relatively low speed portions of landing rollout wherein the rudder is not an effective means for directional control of the aircraft and $\delta_{RP}$ and $\delta_{RI}$ are proportional and integral control components given by the expressions $$\delta_{RP} = K_{BR}\Delta\beta_g + K_{PR}\Delta\dot{\psi}$$

and $$\delta_{RI} = (C_{IR}K_{BR}/s)(\Delta\beta_g + \beta_g + \Delta\psi)$$

where $K_{PR}$ and $C_{IR}$ are system constants, s denotes the Laplacian operator, and $K_{BR}$ is a scale factor that increases with aircraft ground track velocity and is selected to provide the most advantageous compromise between proportional and integral rudder control.

The steering control signal generated in accordance with this invention is substantially identical to generation of the rudder control in that integral and proportional control components are utilized which are identical in form to the integral and proportional components of the rudder control signal. However, since the corrective force established by the aircraft steering system is not a monotonically increasing function relative to increased angular deflection of the steered wheels, signal limiting is employed which prevents the proportional and integral components (and the sum thereof) from resulting in excessive deflection of the steering gear which would fail to result in the maximum available corrective action and, in fact, could worsen the control problem.

To provide differential braking for maintaining the aircraft on the runway only in situations wherein the rudder and steering control signals are not bringing about the desired correction in the trajectory of the aircraft and only while the aircraft is operating within the relatively low speed portion of the landing rollout sequence, the invention overrides conventional pilot-initiated differential braking by equalizing the control signals transmitted to both the left and right braking element (i.e., the left and right metering valves of a conventional brake/antiskid system) and selectively reduces the left or right brake signal below the equalized value to thereby assert a corrective yaw moment. More specifically, the differential braking of the invention is based on the ground roll course error (difference between the actual and desired trajectory of the aircraft) and on the time rate of change in the yaw position of the aircraft. No differential braking is applied (e.g., both the right and left brakes receive a signal representative of the maximum right and left brake signal being applied by the pilot) unless and until a weighted sum of the ground roll course error and the aircraft yaw rate exceeds a predetermined value (e.g., until $C_1 \Delta\beta_g + C_2 \Delta\dot{\psi}$ exceeds unity, where $\Delta\beta_g$ and $\Delta\dot{\psi}$ respectively represent the ground roll course error and the aircraft yaw rate and $C_1$ and $C_2$ are predetermined constants that are selected to preclude differential braking unless control of the aircraft rudder and steering is not resulting in the desired ground roll course correction). When the weighted sum being utilized exceeds the predetermined threshold value, the signal supplied to the appropriate one of the left and right brakes is decreased by a factor that is inversely related to the weighted sum of the ground roll course error and aircraft yaw rate. For example, in the disclosed embodiment of the invention wherein the differential braking signal is of the above mentioned form $B = C_1 \Delta\beta_g + C_2 \Delta\dot{\psi}$, the differential braking factor is, $1/(1+(|B|-1)K_{AB})$, where the vertical bars denote the absolute value of the indicated argument and $K_{AB}$ is a scale factor which is a function of velocity and which "washes out" the differential braking signal when the aircraft is operating within the relatively high speed portions of the landing rollout sequence.

In accordance with another aspect of the invention, an embodiment implementing the above discussed steering, rudder and differential braking control can be augmented to additionally provide either or both of two specific features. First, if desired or necessary, the ground roll course error signal can be modified or optimized so that the ground velocity slip angle (i.e., the angle between the longitudinal body axis of the aircraft and the aircraft ground track velocity) that results from system control of the aircraft rudder, steering and braking does not exceed the slip angle which results in generation of the maximum corrective lateral force and moment. In particular, the lateral force that is established by yawing the aircraft into a crosswind does not increase monotonically with increasing ground velocity slip angle, but reaches a maximum value that is a function of both the aerodynamic characteristics of the aircraft and the configuration of the aircraft landing gear and steering system. In accordance with the invention, the ground slip angle that is commanded by the system is maintained in the monotonically increasing portion of the lateral force generation-ground velocity slip angle characteristic of the aircraft (i.e., at or near the most advantageous value) by modifying the ground roll course error signal whenever the system would otherwise supply control signals that would result in ground velocity slip angles that exceed the slip angle which results in maximum corrective action.

In the disclosed embodiment of the invention, the slip angle limiting is effected by monitoring changes in the lateral acceleration of the aircraft relative to changes in ground velocity slip angle to, in effective, determine when the aircraft is operating at or near the point at which maximum corrective lateral force and restoring moments are being generated and to supply a signal representative of the slope of the lateral force generation-ground velocity slip angle characteristic. This signal is multipled by a constant and combined with the ground roll course error signal in a manner which modifies the system rudder, steering and differential braking signals so that the combined effect of the control signals does not result in excessive ground velocity slip angles.

The second additional or optional feature that can be incorporated in the invention modifies the differential braking signals so as to optimize the corrective lateral forces and restoring moments generated during braking. In particular, conventional brake/antiskid systems of the type employed with the invention, are designed to maximize generation of a braking force that is directed along the longitudinal body axis of the aircraft relative to various conditions of brake command and wheel slip. Configuring the aircraft brake/antiskid system in such a manner does not maximize the generation of corrective lateral force or restoring moment in that the lateral forces generated by a fixed or constant brake command signal decrease with an increase in ground velocity slip angle once the ground velocity slip angle exceeds a certain value and, when the aircraft is operated at these excessive ground velocity slip angles, additional corrective lateral force cannot be obtained without reducing braking action. In this regard, the present invention includes three alternative brake relief arrangements which reduce braking whenever conditions are such that control of the aircraft rudder and steering and the basic differential braking control are not providing the desired corrective action and it is advisable to obtain additional corrective action at the potential cost of increasing the distance required to execute landing rollout. As shall be described in more detail, the first alternative arrangement for providing the above described brake relief is based on the current ground velocity slip angle of the aircraft and reduces the differential braking signals for large slip angles that are accompanied by a significant ground roll course error. In the second alternative embodiment, the vertical and lateral forces on the landing gear are sensed and differential braking is decreased when the landing gear is developing the maximum lateral force. In the third alternative embodiment, differential braking action is decreased when: (a) the product of the distance between the aircraft and the runway centerline and the time rate of change in that distance is greater than zero; and (b) the product of the aircraft-runway centerline distance and the current ground velocity slip angle is simultaneously greater than zero.

As will be recognized by those skilled in the art and as shall be discussed in more detail herein, the signal processing operations that are utilized in the practice of the invention can be realized by various analog and digital circuit arrangements. In this regard, the invention is disclosed herein in terms of conventional control system diagrams which can be readily implemented in analog or digital form by utilization of conventional circuit design techniques. In this regard, the invention is especially suited for use in or realization as a computer or microprocessor based system of the type often utilized to implement various aircraft navigation and control systems. When such a sequential signal processing arrangement is utilized, the necessary firmware and programming can be readily produced in view of the control system diagrams contained herein and the accompanying discussion of the related function and structure.

BRIEF DESCRIPTION OF THE DRAWING

These and other aspects and advantages of the present invention will be recognized by those skilled in the art upon reading the following description taken together with the accompanying drawing wherein:

FIG. 5 is a control system diagram illustrating the generation of a steering control signal in accordance with this invention;

FIG. 6 is a control system diagram illustrating the generation of a rudder control signal in accordance with this invention;

DETAILED DESCRIPTION

Figure 1:
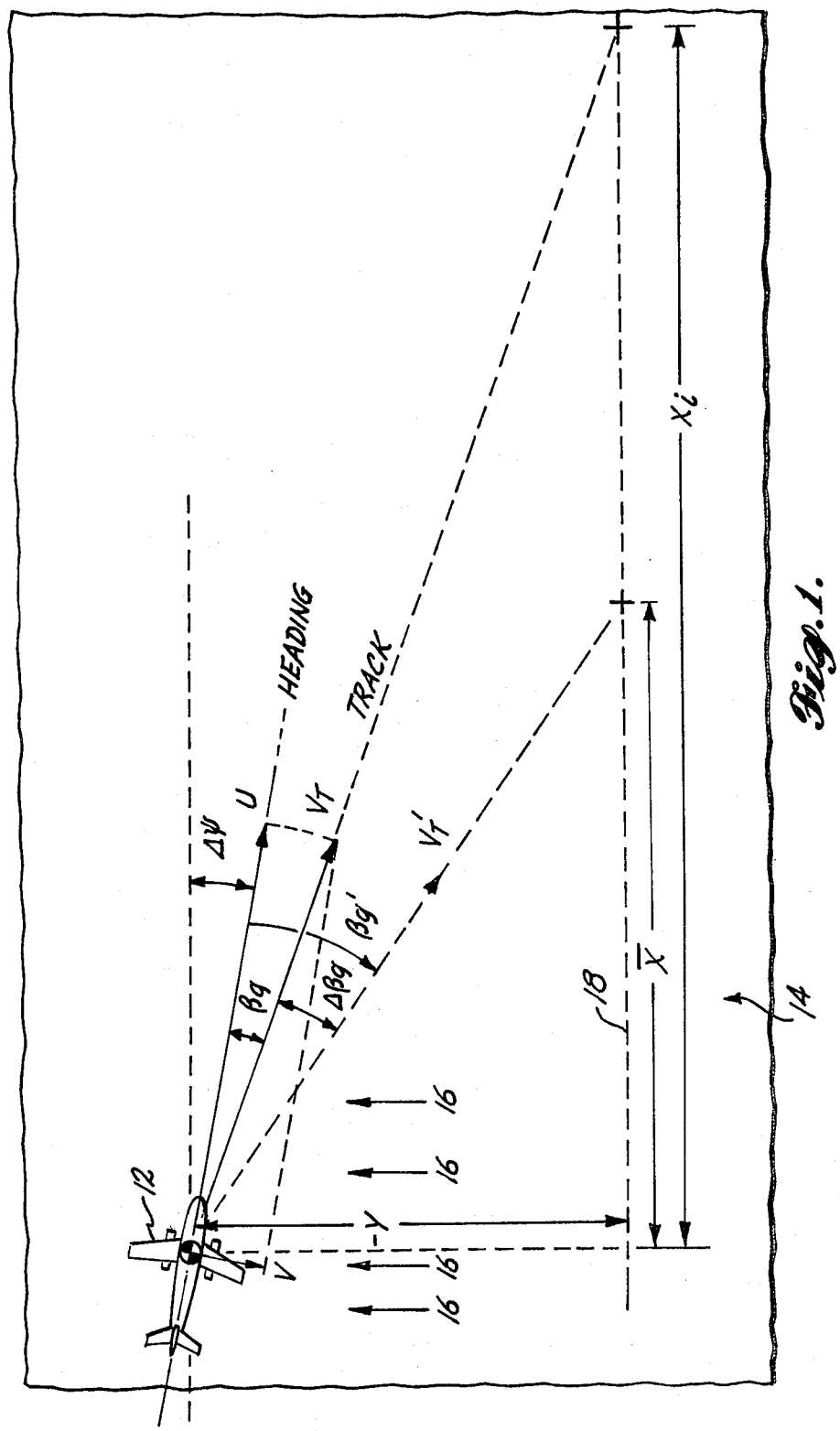
FIG. 1 graphically depicts the geometric considerations attendent and components of velocity of an aircraft that is executing a crosswind landing rollout on a runway having a reduced coefficient of surface friction.

FIG. 1 depicts an aircraft 12 that has touched down on a runway 14 and is executing a landing rollout under conditions of combined crosswind (denoted by the arrows 16) and low runway friction. For convenience of description, the centerline 18 of runway 14 is considered to be coincident with the X axis of a Cartesian coordinate system having the Y axis thereof passing through the center of mass 20 of aircraft 12. Thus, aircraft 12 of FIG. 1 is located a distance of Y from runway centerline 18 and exhibits a heading or yaw angle of $\Delta\psi$ relative to runway centerline 18. In the depicted arrangement, aircraft 12 exhibits a longitudinal body axis velocity (i.e., a component of velocity in the direction of the aircraft heading) of U and a lateral body axes velocity of V. Since lateral body axis velocity V of FIG. 1 is directed toward runway centerline 18, it can be noted that, in the depicted situation, aircraft 12 is being operated in a manner wherein the lateral forces on the aircraft that result from the aircraft's aerodynamic state and from interaction of the aircraft landing gear with the runway (including operation of the landing gear steering system) more than offsets the lateral force generated by crosswind 16. Specifically, aircraft 12 of FIG. 1 exhibits a ground track velocity of $V_T$, which is the vector sum or resultant of longitudinal body axis velocity U and lateral body axis velocity V with $V_T$ exhibiting a ground velocity slip angle, $\beta_g$, which would cause aircraft 12 to intercept runway centerline 18 at an x-coordinate of $x_i$ (if all conditions indicated in FIG. 1 remain constant).

Although FIG. 1 diagrammatically depicts a situation wherein aircraft 12 is being directed toward runway centerline 18 as it might be when corrective action for an off-center touchdown or previous sliding of aircraft 12 toward the edge of runway 14 is being asserted, the corrective action may not be optimal or of the desired magnitude. In this regard, the hereinafter discussed embodiments of the present invention are configured and arranged to utilize a predetermined "aiming point" or projected runway centerline intercept that is denoted as $\bar{x}$ in FIG. 1, which for the depicted situation is of a magnitude less than $x_i$. Thus, aircraft 12 of FIG. 1 exhibits a ground roll course error in that the desired corrective action would cause aircraft 12 to exhibit a track velocity $V'_T$ (referred to herein as the desired track velocity) which exhibits an intended or desired ground velocity slip angle of $\beta'_g$. In the depicted situation $\beta'_g$ is greater than the actual ground velocity slip angle $\beta_g$ so that the ground roll course error signal $\Delta\beta_g$ is a positive angle.

The control parameters utilized by the present invention in establishing corrective yaw moments that decrease the ground roll course error signal of FIG. 1 (i.e., decrease the differential ground velocity slip angle $\Delta\beta_g$) can be understood in view of the stated equations that define and describe the motion of aircraft 12 in the coordinate system of FIG. 1. In particular, relative to the 3 degree of freedom system that is based on the longitudinal body axis of aircraft 12, the lateral body axis of aircraft 12 and Y (the lateral displacement of aircraft 12 from runway centerline 18), the basic equations of motion for the system of FIG. 1 are:

$$\dot{U} = \frac{1}{m}\Sigma F_X - V\Delta\dot{\psi}$$

$$\dot{V} = \frac{1}{m}\Sigma F_Y + U\Delta\dot{\psi}$$

$$\Delta\ddot{\psi} = \frac{1}{I}\Sigma N$$

$$\dot{Y} = U \sin \Delta\psi + V \cos \Delta\psi$$

where $\dot{U}$, $\Delta\ddot{\psi}$, $\dot{V}$, and $\dot{Y}$, respectively indicate the derivatives with respect to time of the longitudinal body axis velocity, the aircraft yaw (relative to the runway centerline 18), the lateral body axis velocity, and the displacement of aircraft 12 from runway centerline 18; m represents the mass of aircraft 12; I represents the moment of inertia of aircraft 12; and $F_x$, $F_y$ and N, respectively represent the aerodynamic and ground longitudinal, lateral and yaw forces and moments relative to the aircraft body axis, (which forces and moments are functions of the state variables).

An appropriate set of system parameters can be obtained from the above stated equations by recognizing that both the aircraft yaw rate $\Delta\dot{\psi}$ and lateral velocity $\dot{Y}$ must be controlled to maintain aircraft 12 within a range of stable dynamic behavior and by noting that $\dot{Y}$ can be expressed in terms of the aircraft body axis by means of the relationship $\dot{Y}/U \cong \Delta\psi + (V/U)$, which remains valid for all values of $\Delta\psi + (V/U)$ that are less than 20 degrees. In particular, applying the above-noted transformation of the control parameter $\dot{Y}$ and selecting the lateral position of aircraft 12 relative to runway centerline 18 as the necessary measure of ground roll course error, it can be shown that the set of parameters: Y, $\Delta\dot{\psi}$ and $(\Delta\psi + (V/U))$ can be utilized to formulate control system equations (control laws) suitable for controlling aircraft ground roll and, hence, for use in the present invention.

Moreover, since $\beta_g = \arctan (V/U)$ and $\beta'_g = -(\Delta\psi + \arctan (V/U))$, it can be recognized that, for angles of approximately 20 degrees and less, $\Delta\beta_g$ is substantially given by the expression $\Delta\beta_g = (-(Y/\bar{X}) + \Delta\psi + (V/U))$. Comparing this expression for $\Delta\beta_g$ with the above discussed set of system control parameters it can be noted that a fully equivalent set of system parameters consists of $\Delta\beta_g$ (used as the ground roll course error signal) and $\Delta\dot{\psi}$ (used as the controlling parameter).

Figure 2:
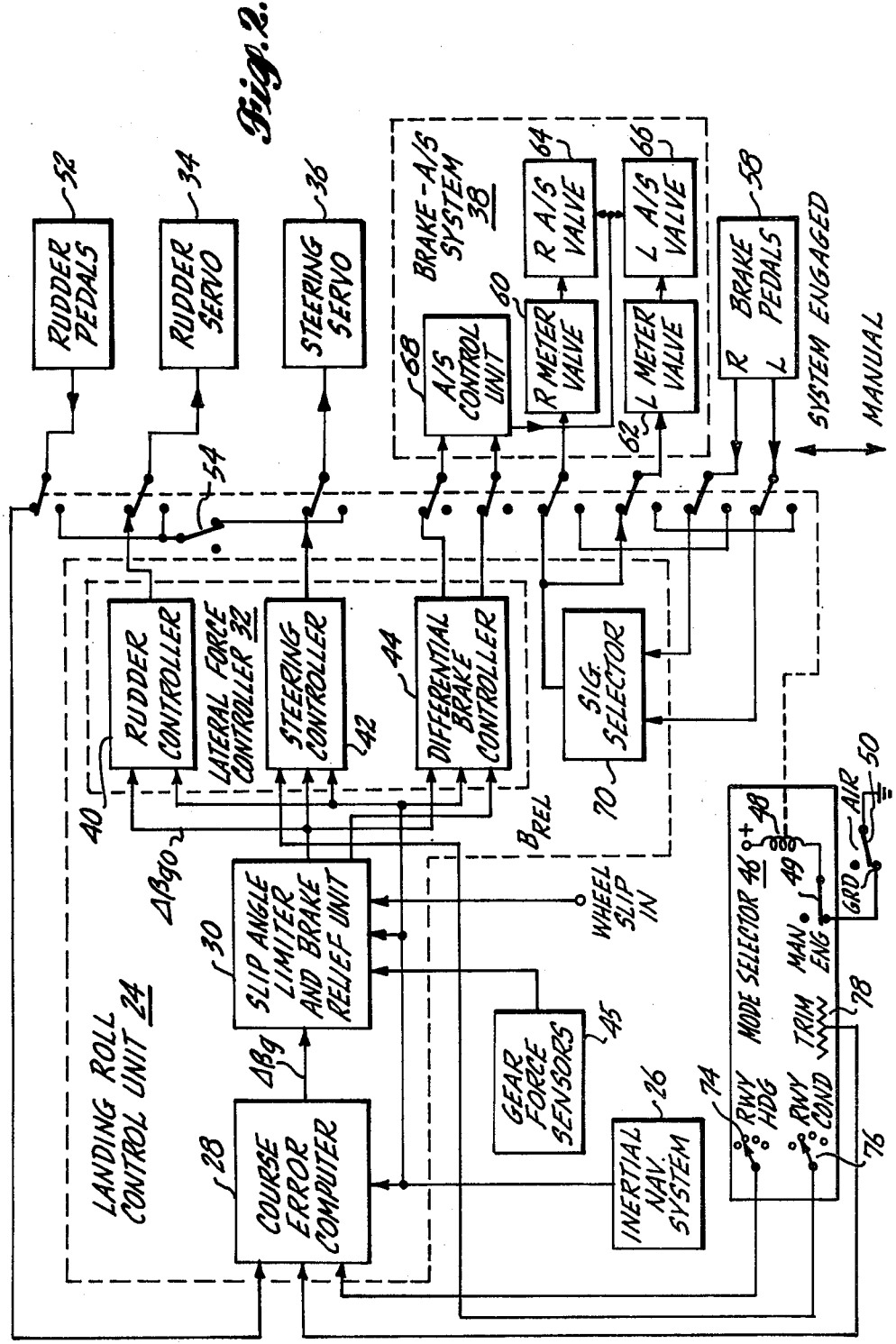
FIG. 2 is a block diagram representation of a landing rollout directional control system that is configured in accordance with this invention and is interconnected with conventional rudder, steering and brake/antiskid systems.

Turning now to FIG. 2, the basic arrangement of the landing rollout directional control system of this invention can be understood in view of the geometric considerations of an aircraft executing a landing rollout and the underlying system parameters, both of which have been discussed relative to FIG. 1. In this regard and as shall be described in more detail, in the arrangement of FIG. 2 signals representative of the previously discussed aircraft body axis velocity components U and V, the aircraft yaw position coordinate $\Delta\psi$ (i.e., the aircraft heading relative to runway centerline 18) and the time rate of change in the aircraft yaw position ($\Delta\dot{\psi}$) are supplied to a landing roll directional control unit 24 by a conventional inertial navigation system 26. As is indicated in block diagram form, landing roll directional control unit 24 includes structure for functionally performing signal processing operations that can be described and understood relative to the illustrated cascade-connected arrangement of a course error computer 28, a slip angle limiter and brake relief unit 30 and a lateral force controller 32. In this arrangement, course error computer 28 determines the previously discussed ground roll course error signal $\Delta\beta_g$ and lateral force controller 32 utilizes this signal (or a processed version thereof that is supplied by slip angle limiter and brake relief unit 30) to supply control signals to the aircraft rudder (rudder servo 34 in FIG. 2), the aircraft steering system (steering servo 36 in FIG. 2) and the aircraft braking system (brake/antiskid unit 38 in FIG. 2). As shall become apparent upon understanding the arrangement of FIG. 2 and the more detailed aspects of the invention discussed relative to FIGS. 4 through 7, lateral force controller 32 includes a rudder controller 40, a steering controller 42 and a differential brake controller 44, which respectively supply the control signals to rudder servo 34, steering servo 36 and brake/antiskid system 38 in a manner which coordinates rudder, steering and brake operation to achieve substantially improved directional stability and control throughout all phases of a landing rollout under conditions of crosswind and reduced runway surface friction which lie outside the operational capabilities of an aircraft equipped with prior art landing control systems.

Slip angle and brake relief unit 30, which can be eliminated in some embodiments of the invention, functions to modify the signals provided to lateral force controller 32 in a manner which: (a) maintains the actual or current ground slip angle, $\beta_g$, within a range wherein an increase in $\beta_g$ that is caused by selective operation of the aircraft rudder, steering and/or braking system results in an increase in the lateral corrective force; and (b) under relatively severe conditions, reduces the braking command generated by brake/antiskid system 38 in order to increase the lateral force generation capability of the aircraft tires. As shall be described in detail relative to FIGS. 8–11, both the desired modification of the signal representing $\Delta\beta_g$ (to form a signal $\Delta\beta_{g0}$ in FIG. 2) and generation of a suitable brake release signal ($B_{REL}$ in FIG. 2) can be obtained by utilizing the ground roll course error signal $\Delta\beta_g$ in conjunction with signals supplied by inertial navigation system 26. An alternative arrangement for generating the brake relief signal based on the ground roll course error signal $\Delta\beta_g$ and on signals representative of the landing gear vertical and lateral force components (supplied by gear force sensors 45 in FIG. 2) is discussed relative to FIG. 12 and a second alternative arrangement for supplying the brake relief signal based on $\Delta\beta_g$ and signals representative of the lateral position (Y) and lateral velocity ($\dot{Y}$) of the aircraft is described relative to FIG. 13.

With continued and more detailed reference to FIG. 2, the depicted landing rollout directional control system includes a mode selector 46 which allows the aircraft pilot to selectively activate the system or to operate the aircraft rudder, steering and braking system in the conventional manner. In this regard, mode selector 46 of FIG. 2 includes a relay 48 that is energized via a system engage switch 49 and a serially connected air-ground switch ("squat switch") 50 that are interconnected so that the aircraft rudder, steering and brake systems will not be affected by the invention unless the pilot has activated the system and the aircraft has touched down on the runway.

More specifically, in the arrangement of FIG. 2, relay 48 (illustrated in the "system engaged" condition) directs the signal supplied by the aircraft rudder pedals (52 in FIG. 2) to the aircraft rudder servo 34 and to a steering switch 54 whenever relay 48 places the system in the "Manual" condition. Switch 54 is a component of conventional landing control system and is selectively operated by the pilot to couple the rudder pedal signal to steering servo 36 whenever the aircraft is on the ground and the rudder pedals are to be utilized to activate steering servo 36. As is also shown in FIG. 2, when the system is in the manual condition, relay 48 couples the left and right brake signals supplied by the aircraft brake pedals 58 to a right metering valve 60 and a left metering valve 62 that are included in brake/antiskid system 38. As is known in the art, metering valves such as right and left metering valve 60 and 62 are conventional components of an antiskid system that are controlled in accordance with the force the pilot asserts on the right and left brake pedals, respectively, to supply control signals to right and left antiskid valves 64 and 66 to thereby control the aircraft brakes. As is indicated in brake/antiskid system 38 of FIG. 2, the right and left antiskid valves 64 and 66 are also controlled by an antiskid control unit 68. In such an arrangement, that force is asserted by the pilot on the brake pedals 58 activates right and left antiskid valves 64 and 66 while antiskid control unit 68 modulates the right and left antiskid valves to substantially optimize braking action (force generation in the negative x direction in FIG. 1) for the particular input provided by the pilot.

When the landing rollout directional control system of this invention is energized (by concurrent activation of system engagement switch 49 and squat switch 50), relay 48 couples the signal supplied by rudder pedals 52 to one input terminal of course error computer 28 and couples the left and right brake control signals provided by brake pedals 58 to the input terminals of a signal selector 70. In accordance with the depicted embodiment of the invention, signal selector 70 supplies a common signal to both right metering valve 60 and left metering valve 62 via contacts of relay 48 to thereby eliminate pilot-initiated differential braking of the type discussed relative to conventional operation of brake-/antiskid system 38 and, as described hereinafter, permit the landing rollout control system of this invention to assert differential braking that aids in correcting the ground roll course error under conditions wherein the necessary corrective forces cannot be developed by suitable control of the aircraft rudder and the aircraft steering system. Although other arrangements can be employed, satisfactory operation is generally attained when signal selector 70 is configured to supply a signal equal in magnitude to the largest of the right and left brake signals.

As thus far described, the arrangement shown in FIG. 2 is configured for operation in a semiautomatic mode wherein rudder pedals 52 are operated by the pilot to provide a signal representative of the direction of desired travel, i.e., a signal proportional to the desired ground slip angle $\beta'_g$ of FIG. 1. That is, in the semiautomatic mode of operation of this invention the pilot operates rudder pedals 52 or similar apparatus to, in effect, aim at a point on runway centerline 18 that lies a suitable distance ahead of the aircraft. Since the signal provided when rudder pedals 52 are operated in this manner is (or can be) referenced to the aircraft heading, it is representative of the desired ground slip angle $\beta'_g$ in FIG. 1. Further, since the ground roll course error signal $\Delta\beta_g$ is equal to $\beta'_g - \beta_g$ and $\beta_g$ is equal to arctan (V/U), a suitable course error signal is provided in the semi automatic mode of operation by configuring or arranging course error computer 28 to perform signal processing that produces a signal representative of $\beta'_g - $arctan (V/U). The necessary operation is depicted in control system format in FIG. 3 with the signal supplied by rudder pedals 52 being coupled to a selector switch 80. When switch 80 is placed in a "semiauto" position, the $\beta'_g$ signal that is supplied by rudder pedals 52 is coupled to one input port of a summing unit 82, which supplies the system ground roll course error signal $\Delta\beta_g$ to slip angle limiter and brake relief unit 30 (or, in embodiments not equipped with a slip angle limiter and brake relief unit, directly to lateral force controller 32). Since the second input port of summing unit 82 is a "subtractive input" and is connected for receiving a signal representative of arctan (V/U) that is supplied by a signal processing circuit 84, the desired signal processing is achieved.

Figure 3:
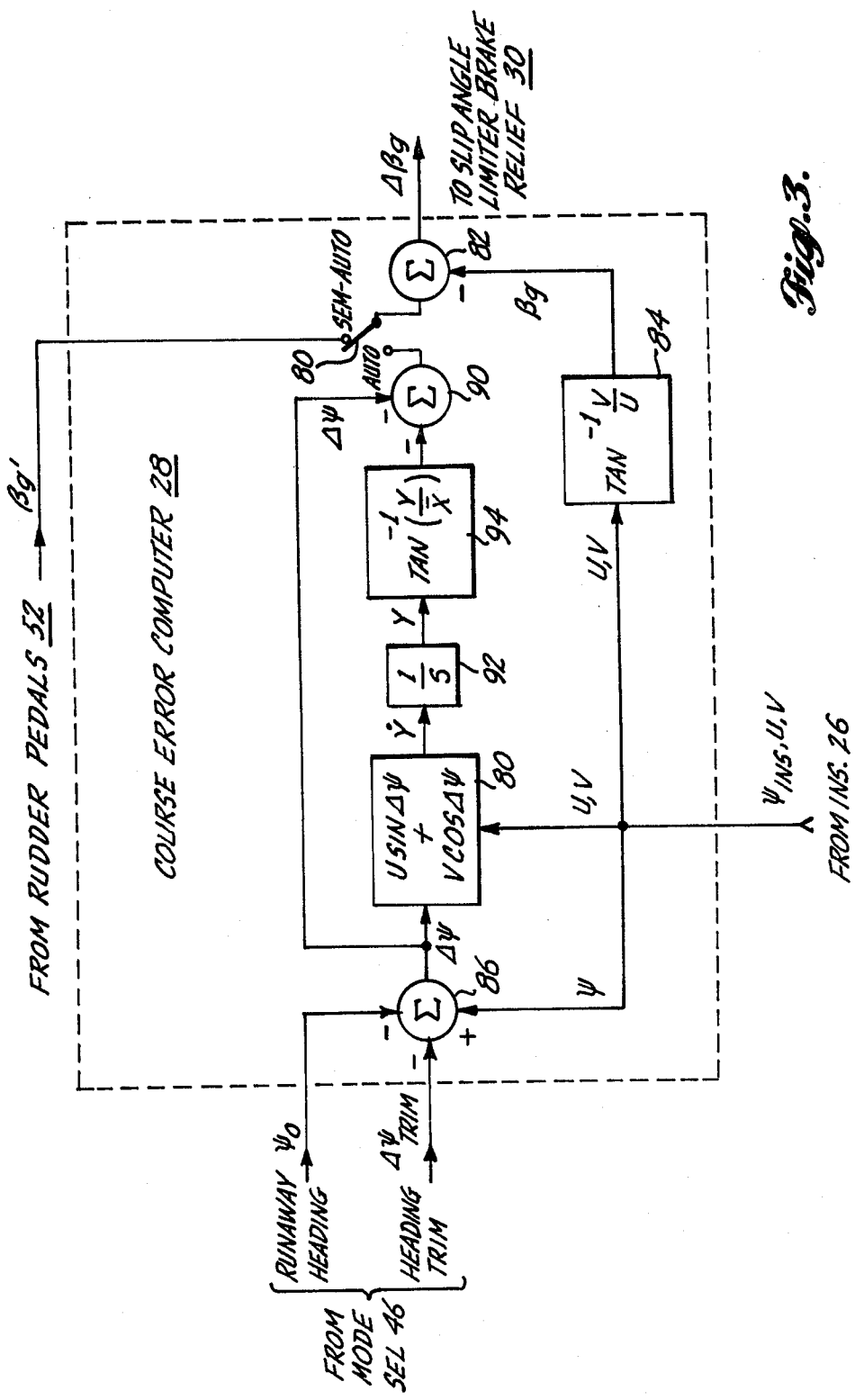
FIG. 3 is a control system diagram illustrating the generation of a ground roll course error signal in accordance with the present invention.

FIGS. 2 and 3 also collectively illustrate arrangement of the invention for operation in an automatic mode wherein the ground roll course error signal $\Delta\beta_g$ is determined on the basis of the heading of the runway to be utilized and signals provided by inertial navigation system 26, rather than being derived from a desired slip angle signal ($\beta'_g$) that is provided by operation of rudder pedals 52 or an equivalent pilot-activated device. More specifically, operation of the depicted embodiment of the invention in the automatic mode differs from the above-discussed semiautomatic operation in that the signal processing that is effected by course error computer 28 to provide ground roll course error signal $\Delta\beta_g$ utilizes a runway heading signal (denoted herein as $\psi_0$), which is provided by a conventional selector switch 74 that is located in mode selector 46 and is operated by the pilot prior to initiation of the landing sequence. In addition, to facilitate correction of the aircraft ground roll trajectory for minor deviations that can be caused by an off-center touchdown, slight accuracies in the listed runway heading and other factors, mode selector 46 includes a trim control 78 that can be manually operated by the pilot during an automatic landing rollout sequence. Although schematically illustrated in FIG. 2 as a variable resistance device, trim control 78 can be any device that allows the pilot to couple a signal to course error computer 28 which indicates that the aircraft is tending to drift to the left or right of the desired ground roll trajectory. For example, it is possible to utilize a small compact rheostat which is connected or arranged so that the center arm or wiper can be deflected to selectively provide signals of positive and negative polarity and selected magnitude to thereby indicate both whether left or right correction is desired and the magnitude of the desired correction. Alternatively, in other embodiments of the invention trim control 78 can be a switch arrangement that is operable to selectively provide a positive or negative signal of predetermined amplitude to indicate the desirability of left or right correction and course error computer 28 can include means for integrating the trim signal supplied by trim control 78 so that the amount of ground roll trim correction is determined by the length of time trim control 78 is activated.

Regardless of the type of trim control utilized, course error computer 28 utilizes the heading of the aircraft, the runway heading signal provided by selector switch 74 and the heading trim signal supplied by trim control 78 to provide a signal representative of aircraft yaw angle relative to the centerline of the runway ($\Delta\psi$ in FIG. 1). This yaw signal is then combined with signals provided by inertial guidance system 26 in accordance with the previously set forth state equations that describe the motion of the aircraft relative to the runway so as to provide the system ground roll course error signal $\Delta\beta_g$.

Operation of the invention in the automatic mode can be more fully understood in view of the control system diagram of FIG. 3 wherein a summing unit 85 having first and second subtractive inputs that receive the runway heading signal $\psi_0$ and the heading trim signal $\Delta\psi_t$ and an additive input port that receives the aircraft heading signal $\psi_{INS}$ supplies the heading signal $\Delta\psi=\psi_{INS}-\psi_0-\Delta\psi_t$ to the input of a logic unit 88 and to a subtractive input port of a summing unit 90. Logic unit 88 also receives signals representative of the longitudinal and lateral body axis velocites (U and V) of aircraft 12 and includes means for determining the time rate of change in the displacement of aircraft 12 from the runway centerline 18 in accordance with the previously set forth expression $\dot{Y}=U\sin\Delta\psi+V\cos\Delta\psi$. As previously mentioned, in the currently preferred embodiments of the invention, course error computer 28 and various other portions of the signal processing discussed relative to FIG. 2 are realized by sequential digital signal processing arrangements such as a programmable digital computer or a microprocessor circuit. In such configurations appropriate values of the sine and cosine of $\Delta\psi$ are stored in memory and accessed as needed to perform the indicated arithmetic operations.

As is indicated in FIG. 3, the signal $\dot{Y}$, which is supplied by logic unit 88, is coupled to an integrator 92 which supplies a signal Y that is representative of the distance between aircraft 12 and runway centerline 18 to a signal processing unit 94. Signal processing unit 94 is a dedicated logic arrangement or a portion of the operational sequence in the previously mentioned sequential computing arrangements of the currently preferred embodiments of the invention and supplies a signal representative of arctan (Y/x) to a second subtractive input port of summing unit 90. Since the output port of summing unit 90 is coupled to one input port of summing unit 82 via selector switch 80 whenever the system is operated in the automatic mode and, as previously described, the subtractive input port of summing unit 82 receives a signal representative of arctan (V/U) from signal processing circuit 84, it can be recognized that summing unit 82 supplies a signal $$\Delta\beta_g=-[\arctan(Y/x)+\Delta\psi+\arctan(V/U)]$$

to slip angle limiter and brake relief unit 30 (or embodiments of the invention not so equipped, directly to lateral force control 32).

As previously mentioned, slip angle limiter and brake relief unit 30 is not required in all embodiments of the invention and the structure and operation thereof will be more easily understood after understanding the structure and operation of lateral force controller 32. In this regard, it will be recalled that rudder controller 40, steering controller 42 and differential brake controller 44 of lateral force controller 32 are configured to provide separate or independent rudder, steering and braking signals that cooperatively interact so that: (a) the aircraft rudder is the primary lateral control mechanism at touchdown and at the higher ground roll speeds; (b) both rudder and steering are utilized in an intermediate speed portion of the landing roll wherein the rudder begins to lose effectiveness as a means of lateral control; and (c) the differential braking controller 44 is primarily effective in the lower speed range of the landing rollout sequence and is configured to control the aircraft by differential braking if conditions are such that the rudder and/or steering cannot establish lateral force levels that are sufficient to maintain the aircraft at or near the desired ground roll trajectory.

In accordance with the invention, the independent (but interrelated) rudder, steering and differential braking signals are based on the previously discussed ground roll course error signal $\Delta\beta_g$ that is supplied by course error computer 28 (or, in embodiments so equipped, by slip angle limiter and brake relief unit 30) and on velocity and acceleration signals supplied by inertial navigation system 26 or other such conventional sources. In addition, a signal that is representative of the maximum expected coefficient of friction of the runway to be utilized is supplied to steering controller 42 by a conventional selector switch denoted as a runway condition switch 76 and included in mode selector 46 of FIG. 2. In most cases, the maximum coefficient of runway friction or an equivalent runway condition rating can be supplied to the pilot prior to final approach by ground control personnel and switch 76 will be operated accordingly. In extreme cases wherein fairly precise knowledge of the runway condition cannot be radioed to the pilot, switch 76 can be set on the basis of weather conditions (i.e., rain, snow, or ice) and on the appearance of the runway as the final approach is initiated.

Figure 4A:
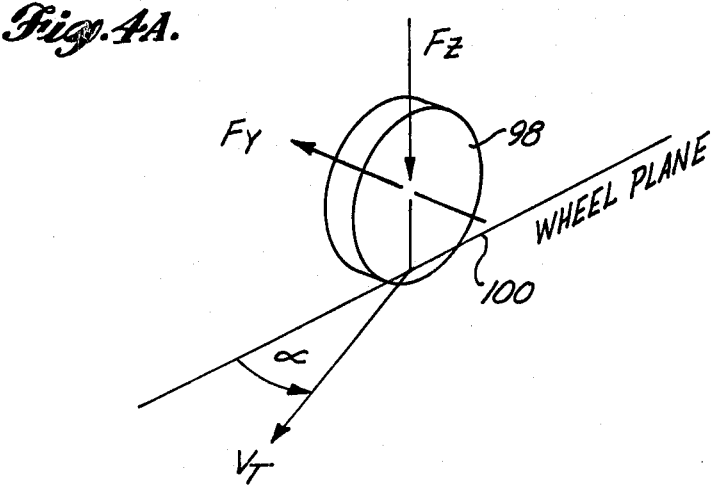
FIGS. 4a and 4b respectively illustrate geometric considerations and force generation characteristics of an aircraft steering system that is useful in understanding the steering control signal generated by the invention.
Figure 4B:
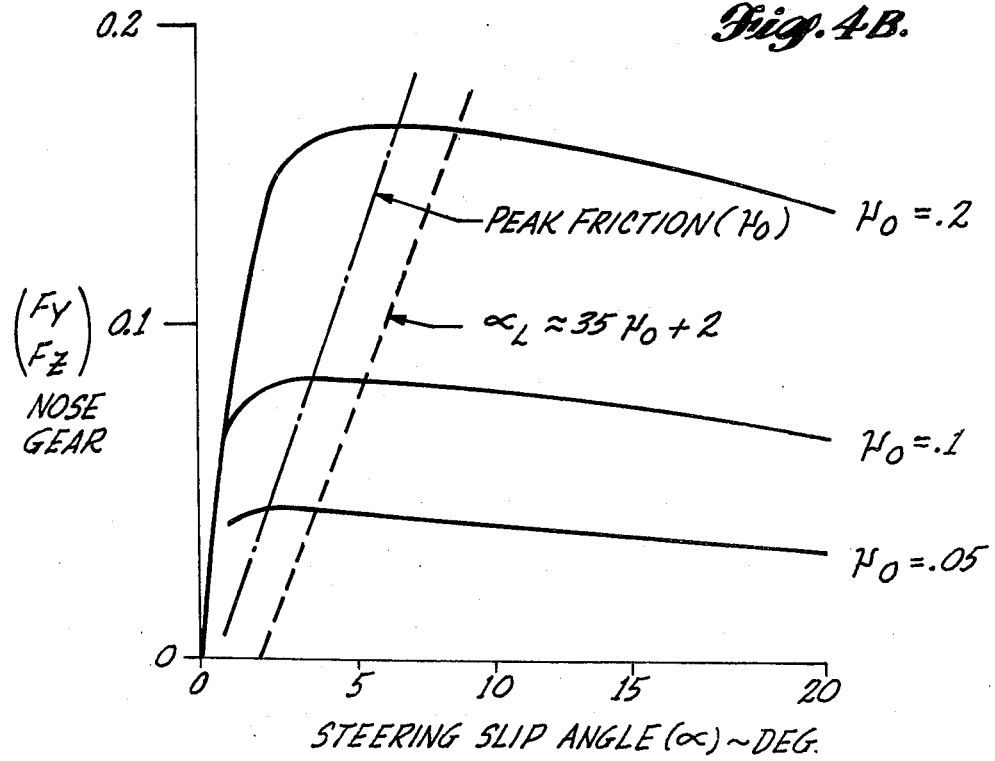

In any case, the importance of utilizing the maximum expected coefficient of friction of the runway in developing the automatic steering control signal of this invention can be understood with respect to FIG. 4, wherein FIG. 4A schematically illustrates the basic geometry of an aircraft wheel 98 that is being steered or yawed away from the direction that the aircraft is travelling along the runway ($V_T$) in an attempt to counteract lateral offset of the aircraft that has resulted because of low runway surface friction ($\mu_0$) and substantial crosswind. As can be recognized from FIG. 4b, the lateral force, $F_y$, established by steering or yawing the aircraft wheel 98 (normalized with respect to vertical loading force, $F_z$, in FIG. 4b) is not a monotonically increasing function of the steering slip angle, $\alpha$ (i.e., the angle defined between the aircraft track velocity, $V_T$, and tire plane 100 in FIG. 4a). For example, with respect to the particular aircraft and surface frictions illustrated by FIG. 4b, the lateral corrective force decreases with increasing tire slip angles ($\alpha$) of more than approximately 8 or 9 degrees for $\mu_0=0.2$ (wet runway); decreases for increasing lip angles of more than approximately 5 degrees for $\mu_0=0.1$ (wet runway with hydroplaning conditions); and decreases for increasing tire slip angles of more than approximately 4 degrees for $\mu_0=0.05$ (icy conditions).

As shall be described in more detail relative to FIG. 5 and as is indicated in FIG. 4, the landing rollout control system of this invention is arranged to limit the steering slip angle $\alpha$ to a maximum value (denoted herein as $\alpha_L$), which is less than or equal to the steering slip angle at which a further increase in angular deflection of the steering wheels result in less (or a constant) lateral corrective force ($F_y$ in FIG. 4B). This prevents the invention from initiating steering commands that are not only ineffective in producing additional lateral correction, but are at least somewhat deleterious. In this regard, it has been found that a satisfactory steering slip angle limit, $\alpha_L$ (can be defined as a linear function of the maximum expected coefficient of friction, $\mu_0$. For example, as is indicated in FIG. 4a, a value of $\alpha_L = 35\mu_0 + 2$ provided satisfactory results in the depicted situation.

The manner in which the steering slip angle, $\alpha$, is limited and the signal processing that is utilized to implement steering controller 42 of the currently preferred embodiment of the invention can be understood with reference to FIG. 5. In this regard, it can be recognized at the outset that the steering controller of FIG. 5 provides a steering control signal $\phi_S$ of the form $\phi_S = \beta_g + \Delta\phi_S$, where $\beta_g$ is the previously discussed actual or current ground velocity slip angle and $\Delta\phi_S$ includes both proportional and integral control components. More specifically and in terms of the control system diagram of FIG. 5, the steering control signal $\phi_S$ is supplied by a summing unit 102 having a first input port connected for receiving a signal representative of $\beta_g$ and a second input port connected for receiving the signal $\Delta\phi_S$ from a limiter unit 104. Limiter unit 104 limits the magnitude of a signal $\Delta\phi_{SI} + \Delta\phi_{SP}$ (which is received from a summing unit 106) to a value which will not result in steering slip angles that exceed $\alpha_L$, with the limiting value, $\alpha_L$, being supplied to limiter unit 104 by a signal processing circuit 108. Signal processing circuit 108 is connected for receiving the signal representative of the maximum coefficient of the runway being utilized ($\mu_0$) and performs the operations that are necessary to derive the desired steering angle limit signal. For example, an analog implementation of a signal processing unit 108 for deriving the limit signal $\alpha = 35\mu_0 + 2$ that was discussed relative to FIG. 4 can be readily realized with a circuit including one or more conventional operational amplifiers, whereas a digital implementation can be realized by either a dedicated digital logic arrangement or as a portion of the operational sequence of a programmed digital device that is utilized to implement other aspects of steering controller 42 and the various other components of the invention. In any case, it can be recognized that the above discussed operation of limiter unit 104 results in a steering control signal $$\phi_S = \beta_g + \Delta\phi_{SP} + \Delta\phi_{SI}$$

for $|\Delta\phi_{SP} + \Delta\phi_{SI}| < \alpha_L$ and $$\phi_S = \beta_g + \text{sign}(\Delta\phi_{SP} + \Delta\phi_{SI})\alpha_L$$

for $|\Delta\phi_{SP} + \Delta\phi_{SI}| \geq \alpha_L$ where $\Delta\phi_{SP}$ and $\Delta\phi_{SI}$ are the hereinafter discussed proportional and integral control signals and the operator "$\mp$sign" denotes utilization of the algebraic sign of the indicated argument (i.e., the algebraic sum of the proportional and integral control signals).

Continuing with the description of a steering controller 42 of this invention, the proportional control signal $\Delta\phi_{SP}$ is determined by the aircraft velocity along its current track, $V_T$; the ground roll course error signal, $\Delta\beta_g$; and the time rate of change in aircraft yaw, $\Delta\dot\psi$. More specifically, in the control system diagram of FIG. 5, signals representative of the lateral and longitudinal body axes velocities V and U that are supplied by inertial navigation system 26 (FIG. 2) are coupled to a first signal processing or function generating unit 109 which supplies a signal $V_T = (V^2 + U^2)^{\frac{1}{2}}$ to a second signal processing or function generating unit 110. In addition, signals representative of $\Delta\beta_g$ and $\Delta\dot\psi$ are respectively coupled from inertial navigation system 26 to a multiplier circuit 112 and a multiplier circuit 114. In this arrangement, the function generating circuit 110 supplies a scale factor $K_{Bs}$, which is a function of the track velocity $V_T$ to multiplier 112 which, in turn, couples a signal representative of the product of $K_{Bs}$ multiplied by $\Delta\beta_g$ to one input port of a summing unit 116. Since the second input port of summing unit 116 is connected for receiving the signal supplied by multiplier 114 and, as is indicated in FIG. 5, multiplier 114 multiplies $\Delta\dot\psi$ by a constant, $K_{Ps}$, it can be recognized that summing unit 116 supplies a porportional control signal $$\Delta\phi_{SP} = K_{Bs}\Delta\beta_g + K_{Ps}\Delta\dot\psi$$

where, as noted above, $K_{Bs}$ is a function of the current aircraft track velocity. In this regard it has been determined that a scale factor of the form $K_{BS} = C_1 + C_2 V_T$ (where $C_1$ and $C_2$ are predetermined constants) provides an advantageous balance between proportional and integral control of the aircraft's steering system and further provides satisfactory interaction of the automatic steering, rudder control and differential braking control of this invention. Although not illustrated in FIG. 5, it may be advantageous to limit the signal provided by summing unit 116 in a manner identical to that described relative to limiter unit 104 and the hereinafter discussed limiter 124.

It will be recognized by those familiar with automatic control of complex systems such as the aircraft steering and braking systems that the exact nature or value of the scale factor $K_{BS}$, the constant $K_{PS}$ and other scale factors and constants discussed herein must be determined on the basis of factors that include the physical properties and aerodynamic characteristics of the aircraft and its rudder, steering and braking system. In this regard, it is generally advantageous to determine initial values for the necessary constants and scale factors based on mathematical models of the relevant aircraft systems and/or analog simulations thereof. These initial values then can be improved or optimized by empirical testing of the automatic landing roll out system on board an actual aircraft or, preferably, in conjunction with a suitably configured aircraft simulator. For example, in the development of this invention, the constants and scale factors discussed herein were initially determined by utilizing conventional computational techniques in conjunction with models of the aircraft rudder, steering and braking system which included only three degrees of freedom (i.e., the lateral, longitudinal and yaw coordinates of the aircraft that are discussed relative to FIG. 1). The scale factors and constants were then optimized by simulation of system operation in conjunction with an aircraft simulator that takes all six degrees of freedom into account and utilizes relatively complex models of the aircraft aerodynamics and subsystems.

Regardless of the techniques employed to determine the scale factors and constants for a particular embodiment, the integral control signal utilized in accordance with this invention is determined on the basis of the ground roll course error signal $\Delta\beta_g$, the actual or current ground velocity slip angle $\beta_g$, and the aircraft yaw position $\Delta\psi$ and is of the form $$\Delta\phi_{SI} = C_{IS}K_{BS}(1/S)(\Delta\beta_g + \beta_g + \Delta\psi)$$

for $|\Delta\phi_{SI}| < \alpha_L$ and $$\Delta\phi_{SI} = \text{sign}(\Delta\phi_{SI})\alpha_L$$

for $|\Delta\phi_{SI}| \geq \alpha_L$ where $C_{IS}$ is a constant that is less than unity and s represents the Laplacian operator. In the control system diagram of FIG. 5, a signal representative of the current ground velocity slip angle $\beta_g$ is provided a signal processing unit 118, which receives signals representative of the longitudinal and lateral velocity of of the aircraft (U and V) from initial navigation system 26 of FIG. 2 and, like signal processing unit 84 of FIG. 3, provides a signal $\beta_g = \arctan(V/U)$. A summing unit 120 having a first input port connected for receiving the signals supplied by signal processing unit 118 and second and third input ports connected for receiving the ground roll course error signal $\Delta\beta_g$ and the aircraft yaw position $\Delta\psi$ supplies a signal representative of the quantity $\Delta\beta_g + \beta_g + \Delta\psi$ to a signal processing unit 122. As is indicated in FIG. 5, signal processing unit 122 multiplies the applied signal by $C_{IS}$; multiplies the resultant signal by $K_{BS}$; and performs the operation of integration (denoted by the Laplacian operation (1/s) in FIG. 5). As is known to those skilled in the art, analog realizations of the signal process performed by signal processing unit 122 generally include one or more amplifiers to perform the multiplication and an analog integrater such as these employing an operational amplifier with a capacitive feedback path. Digital circuits for performing the indicated operations are equally well known and, with respect to the currently preferred computer or microprocessor based embodiments of the invention, the operation of integration can be implemented with one of the numerous algorithms or subroutines that combine values of the variable that are obtained during a current iteration and one or more previous iterations.

Continuing with the control system representation of FIG. 5, the signal developed by signal processing unit 122 is coupled to a limiter unit 124, which functions identically to the previously discussed limiter unit 104. Thus, it can be recognized that limiter unit 124 supplies an integral control signal of the above set forth type. As was previously discussed, the integral and proportional control signals are coupled to the input ports of a summing unit 106 with the output signals supplied by summing unit 106 being limited to prevent control actions which result in steering slip angles greater than $\alpha_L$ and being combined with the actual or current ground velocity slip angle $\beta_g$ to provide a signal for controlling the aircraft steering system (e.g., steering signal 36 of FIG. 2).

The rudder control that is automatically developed in the practice of this invention is similar to the above discussed steering control in that both integral and proportional control components are utilized wherein: (a) proportional control is based on the aircraft ground track velocity ($V_T$), the ground roll course error signal ($\Delta\beta_g$) and the time rate of change in aircraft yaw position ($\Delta\dot\psi$); (b) integral control is based on $\Delta\beta_g$, aircraft yaw position ($\Delta\psi$) and the actual or current ground velociity slip angle ($\beta_g$); and (c) both the integral and proportional control components include a scale factor that is a function of the aircraft ground tract velocity $V_T$. On the other hand, rudder control utilized in the practice of this invention differs from the steering control thereof in that: (a) rudder control signal limiting is not required because the lateral force (and, hence, lateral movement of the aircraft) that is developed by a conventional rudder installation increases monotonically throughout the range of left and right rudder deflection angles; and (b) the rudder control signal is generated in a manner which ensures that the lateral force developed by the rudder will dominate all other control forces at touch down and during the initial phase of the landing rollout sequence wherein the aircraft is travelling at a relatively high velocity and the rudder is the most effective way of yawing the aircraft.

More specifically and in terms of the control system diagram of FIG. 6, the rudder control signal of this invention (denoted as $\delta_r$) includes a proportional component, $\delta_{RP}$, and an integral component $\delta_{RI}$ that are supplied to the input ports of a summing unit 126. The signal provided by summing unit 126 is coupled to a signal processing unit 128 which receives a signal representative of the aircraft tract velocity, $V_T$, from signal processing unit 109 of FIG. 5 or from another convenient source. As is indicated in FIG. 6, signal processing unit 128 is configured so as to multiply the signal provided by summing unit 126 ($\delta_{RP} + \delta_{RI}$) by a scale factor $K_{AR}$, which is a function of the aircraft track velocity $V_T$. In this arrangement, $K_{AR}$, is in effect, a "wash out factor" that causes the rudder control signal $\delta_R$ to be substantially equal to the sum of the integral and proportional rudder control signals ($\delta_{RP} + \delta_{RI}$) while the aircraft is executing relatively high speed portions of the landing rollout and rapidly decreases the magnitude of the rudder control signal (and hence the amount of steering that is effected with the aircraft rudder) as the aircraft decelerates. Depending on the particular aircraft involved and the design objectives of a particular embodiment, signal processing unit 128 can utilize anyone of a variety of scale factors $K_{AR}$ that correspond to the above mentioned general characteristics. For example, some embodiments of the invention might advantageously use a scale factor $K_{AR}$ that exhibits a first predetermined value for all ground track speeds that are less than the speed at which the aircraft rudder loses effectiveness and a second predetermined value for all aircraft track speeds above the rudder effectiveness speed. In contrast to such a discontinuous or step function, one realization of the presently perferred embodiment of the invention utilizes a scale factor of $$K_{AR} = e^{(V_T - V_A)/C_3}$$

for $V_A \leq V_T$ and $$K_{AR} = 1$$

for $V_A \geq V_T$ where $V_A$ is a predetermined velocity that is selected on the basis of the directional control capability of the rudder employed on the aircraft of interest and $C_3$ is a preselected positive real number.

Continuing with the signal processing indicated by FIG. 6, the proportional component of the rudder control signal is supplied to the summing unit 126 by a summing unit 130 having the two input ports thereof connected for receiving signals supplied by signal multipliers 132 and 134. Signal multiplier 134 functions like multiplier circuit 114 of the steering controller depicted in FIG. 5 to multiply the signal representative of the time rate of change in aircraft yaw $\Delta\dot{\psi}$ by a preselected scaler value ($K_{PR}$) and signal multiplier 132 functions like multiplier circuit 112 of the steering controller to multiply the ground roll course error signal $\Delta\beta_g$ by a scale factor $K_{BR}$, which is a function of the aircraft ground track velocity $V_T$. In the diagram of FIG. 6, the scale factor $K_{BR}$ is provided by a signal processing unit 136 which functions in a manner similar to the previously discussed signal processing unit 110 of the steering controller depicted in FIG. 5. In this regard and with respect to one particular aircraft, the presently preferred embodiments of the invention utilize a $K_{BR}$ that is negative and is equal to a constant value for ground track velocities below a predetermined velocity (100 knots) and a value of $-0.1385$ $(V_T 44)^2$ for all ground track speeds greater than 100 knots As was previously mentioned, the integral component of the rudder control signal ($\delta_{RI}$) is identical in form to the integral component of the steering control signal discussed relative to FIG. 5. Thus, the control system diagram of FIG. 6 includes a signal processing unit 138 connected for receiving a signal representative of $\Delta\beta_g+\beta_g+\Delta\psi$) (from summing unit 120 of FIG. 5) and supplying a signal $\delta_{RI}$ to an input port of summing unit 126 wherein $\delta_{RI}=(\Delta\beta_g+\beta_g+\Delta\psi)\ C_{IR}K_{BR}(1/s)$, where $C_{IR}$ is a predetermined constant and s is the Laplacian operator.

Combining the above discussed signal processing it can be recognized that the rudder control signal employed in the practice of the invention is given by the expression $$\delta R=K_{AR}[K_{BR}\Delta\beta_g+K_{PR}\dot\psi+(\Delta\beta_g+\beta_g+\Delta\psi)C_{IR}K_{BR}(1/s)]$$

where each of the quantities is defined above.

Turning now to a more detailed discussion of the differential braking utilized in the practice of this invention, it should be recalled that operation thereof in both the semiautomatic and automatic modes eliminates pilot-initiated differential braking by equalizing the signals supplied to both the right and left brakes, with such equalization being effected in the arrangement of FIG. 2 by the previously discussed signal selector 70 which supplies a common braking signal to both the right and left metering valves (60 and 62 of the aircraft brake/antiskid system 38.) With the left and right braking signals equalized in this manner, the invention asserts differential braking to yaw the aircraft toward the runway centerline by selectively reducing the signal being supplied to either the left or right brake (e.g., the antiskid metering valves 60 and 62 of FIG. 2). Thus, it can be recognized that a landing rollout control system figured in accordance with this invention does not initiate differential braking unless the pilot is operating the aircraft brake pedals (58 FIG. 2). Moreover, as previously mentioned and as shall be more fully understood upon considering the differential braking control system diagram of FIG. 7, the present invention is configured and arranged to prevent or minimize generation of a differential braking signal during high speed portions of the landing rollout sequence where rudder control is far more effective in establishing and maintaining a satisfactory ground course roll trajectory. An additional aspect of the differential braking control asserted by the invention that has been mentioned previously and is discussed more fully in the following paragraphs is arrangement of the invention so that differential braking is only applied if the previously discussed rudder and steering control signals ar not resulting in the desired ground roll course correction.

Figure 7:
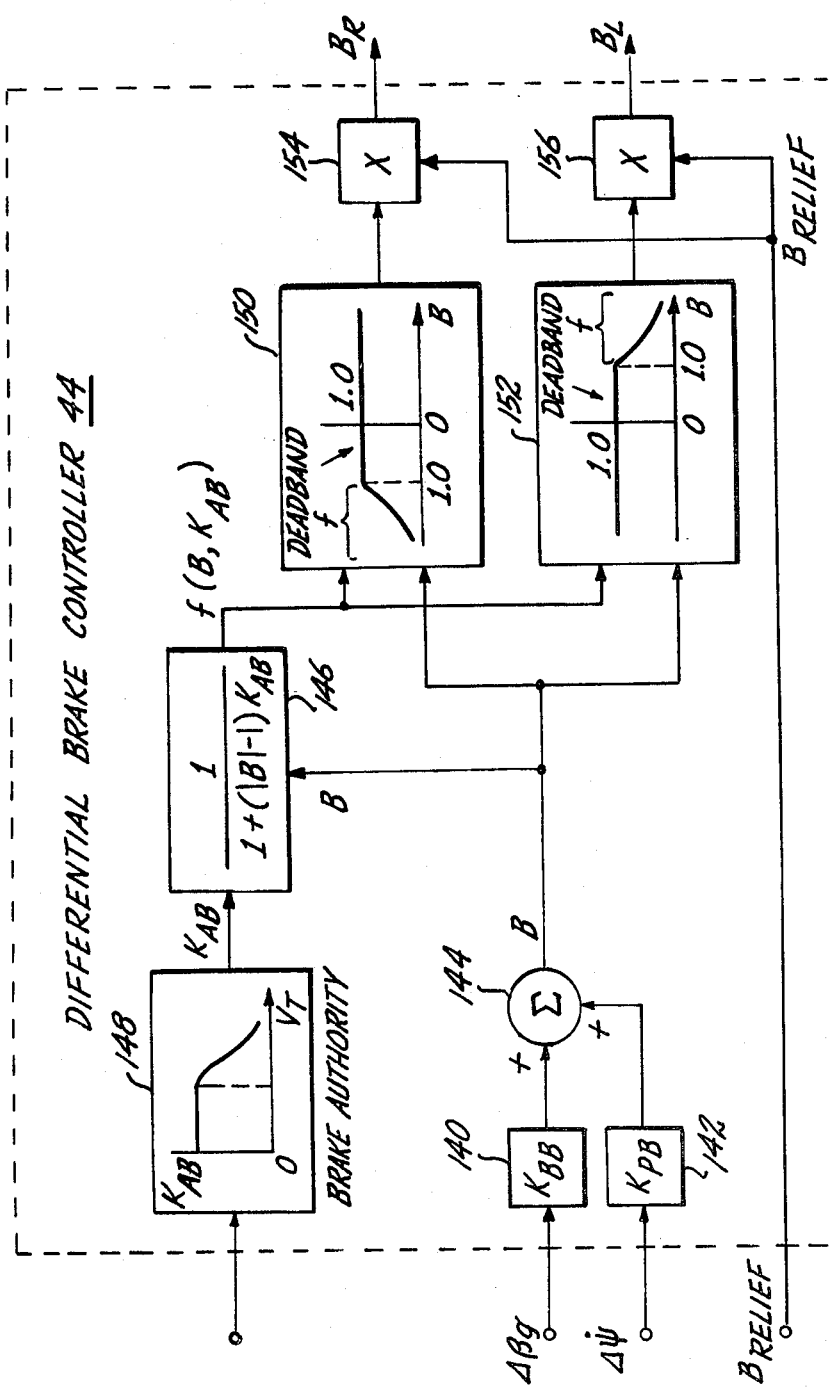
FIG. 7 is a control system diagram illustrating the generation of a differential brake control signal in accordance with the present invention.

With reference to the control system diagram of FIG. 7, the signal processing that is effected by a differential brake controller 44 of this invention is based on the ground roll course error and the time rate of change i aircraft yaw position ($\Delta\beta_g$ and $\Delta\dot\psi$, respectively) with $\Delta\beta_g$ being multiplied by a system constant $K_{BB}$ (by a signal multiplier 140 in FIG. 7) and $\Delta\dot\psi$ being multiplied by a constant $K_{PB}$ (within signal multiplier 142 of FIG. 7). As is indicated by a summing unit 144, the $\Delta\beta_g$ and $\Delta\dot\psi$ terms are summed to form a differential braking signal $B=K_{BB}\Delta\beta_g+K_{PB}\Delta\dot\psi$. In accordance with the invention, the constants $K_{BB}$ and $K_{PB}$ are selected to prevent the system from asserting differential braking until a condition is reached wherein $\Delta\beta_g$ and $\Delta\dot\psi$ indicate that sufficient control cannot be obtained with the aircraft rudder and/or steering system. In particular, the constants $K_{BB}$ and $K_{PB}$ are selected so that the differential braking signal B is greater than a predetermined value (unity in the arrangement of FIG. 7) for all conditions wherein the aircraft is to be steered by differential braking. The braking signal B is then processed so as to provide signals ($B_R$ and $B_L$) that decrease the braking force established by the brakes associated with the right and left main land gear (e.g., by suitably activating metering valves 60 and 62 in the arrangement of FIG. 2) whenever the magnitude of B is greater than the selected predetermined value (unity in the arrangement of FIG. 7) and maintain equal signals to both brakes whenever the magnitude of B is less than the selected predetermined value.

The control system diagram of FIG. 7 illustrates the signal processing utilized to produce the desired right and left brake signals ($B_R$ and $B_L$) in the presently preferred embodiment of the invention. In this regard, in the depicted control system diagram of FIG. 7, the differential braking signal B is coupled to a function generator 146 that produces the function $f(B, K_{AB})=1/(1+(|B|-1)K_{AB})$, where $K_{AB}$ is a scale factor that is a function of the aircraft ground track velocity $V_T$ and is supplied by a signal processing unit 148 in the arrangement of FIG. 7. In particular, $K_{AB}$ is established so that differential braking will only be applied while the aircraft is in the low speed phase of the landing rollout sequence and, as is indicated in FIG. 7, is a function that is substantially equal to a constant when the ground track velocity of the aircraft is less than a first predetermined value and decreases as a function of velocity for ground track velocities greater than that predetermined value. For example, in one realization of the presently preferred embodiment of the invention, scale factor $K_{AB}$ is equal to one for track velocities less than 150 knots and is equal to $e^{(150-V_T)/5}$ when the aircraft ground track velocity exceeds 150 knots.

Regardless of the exact scale factor utilized, the differential brake controller is arranged to develop the right and left brake signals ($B_R$ and $B_L$) by multiplying the differential brake signal, B by the above defined function f (B, $K_{AB}$) if the absolute value of B is greater than unity and by setting both brake signals equal to one (or another predetermined constant value) if the absolute value of B is less than unity. This operation is indicated in the control system diagram of FIG. 7 by gain units 150 and 152 which receive the differential braking signal B and exhibit a transfer function which effects the indicated signal processing. In particular, gain unit 150 exhibits a signal transfer characteristic substantially equal to f (B, $K_{AB}$) for all values of B less than $-1$ and exhibits a transfer characteristic of unit for all values of B greater than $-1$. On the other hand, gain unit 152 exhibits a transfer characteristic of f (B, $K_{AB}$) for all values of B greater than unity and exhibits a transfer characteristic of unit for all values of B less than 1.

In embodiments of the invention that do not include brake relief (i.e., a slip angle limiter and brake relief unit 30 in the arrangement of FIG. 2), the signals developed in the above discussed manner (i.e., the signals supplied by gain unit 150 and 152 of FIG. 7) are respectively utilized as the right and left brake signals ($B_R$, $B_L$). In embodiments of the invention which include brake relief, both the right and left brake signals are multiplied by a brake relief factor, $B_{REL}$ (indicated by the signal multipliers 154 and 156 in the arrangement of FIG. 7) with $B_{REL}$ being supplied by a signal processing arrangement equivalent to slip angle limiter and brake relief unit 30 of FIG. 2 and being equal to a real number between zero and unity, depending on the amount of brake relief being applied.

Figure 8:
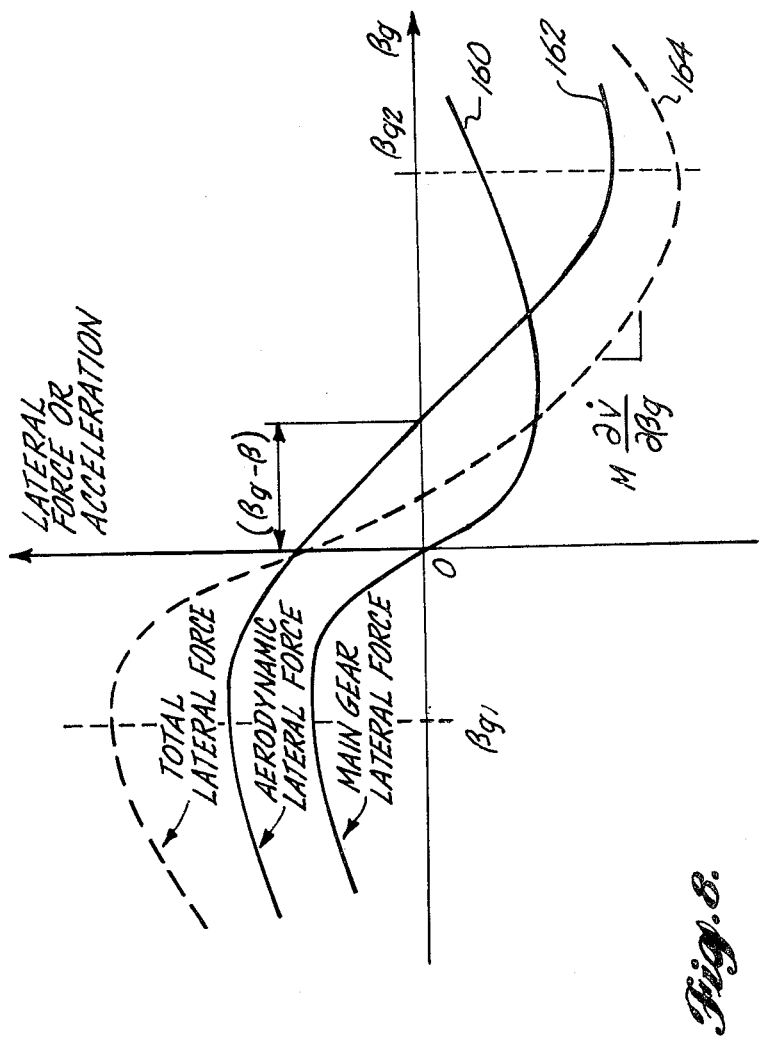
FIG. 8 graphically depicts the lateral forces which act upon an aircraft executing a crosswind landing rollout; such figure being useful in understanding advantages and improved operation that can be achieved by limiting the ground velocity slip angle of the aircraft.

Augmentation of the invention to include the previously mentioned slip angle limiting and brake relief (i.e., the slip angle limiter and brake relief unit 30 of the arrangement depicted in FIG. 2) can be understood in view of the above-discussed structure and operation of the more basic embodiments of the invention and with reference to FIGS. 8 through 13. In this regard, the desirability of limiting or controlling the ground velocity slip angle that results from the control of the aircraft rudder, steering and braking systems by this invention can be understood by reference to FIG. 8, which depicts the lateral (corrective) force that acts on a particular aircraft as a function of ground velocity slip angle. As can be seen in FIG. 8, the lateral corrective force that is developed by the aircraft main landing gear (the characteristic curve identified by the numeral 160 does not continue to increase (decrease) with increasing (decreasing) ground velocity slip angles, but exhibits a maximum value relative to both positive and negative slip angles. In a similar fashion, the aerodynamically-generated lateral force (characteristic curve 162) exhibits similar maximum values with the characteristic curve 162 being translated along the $\beta_g$ axis by an angle substantially equal to the angle between the runway centerline and the direction of the crosswind (since substantially no lateral force is generated if the aircraft is airborn and travelling directly into or away from the wind). Thus, the total lateral force that can be generated by yawing the aircraft during a crosswind landing rollout procedure, which is identified by the numeral 164 in FIG. 8 and is equal to the sum of the aerodynamically-generated lateral force and the lateral force established by the aircraft landing gear, exhibits a positive maximum value at a negative ground slip angle $\beta_{g1}$ in FIG. 8; decreases to a value of zero at a positive ground slip angle that is a function of the angle at which the crosswind intersects the runway and the ability of the aircraft landing gear to produce lateral corrective force; and decreases to a negative maximum force at a positive slip angle denoted as $\beta_{g2}$ in FIG. 8.

To maintain the ground velocity slip angle of the aircraft within a range wherein the lateral force generated is monotonically related to the slip angle (e.g., the slip angle range $\beta_{g1}$ to $\beta_{g2}$ in FIG. 8), the more detailed or augmented embodiments of the invention are configured and arranged to, in effect, detect when the aircraft has obtained a ground velocity slip angle that results in the generation of a maximum amount of lateral corrective force and to modify the course error signal $\Delta\beta_g$ so as to prevent the generation of rudder, steering and differential braking signals that would result in a further increase in ground velocity slip angle (and, hence, a decrease in lateral corrective force). More specifically, a ground velocity slip angle limiter of this invention utilizes the known relationship that the lateral force generated is substantially equal to the effective mass of the aircraft multiplied by the partial derivative of the aircraft lateral acceleration with respect to ground velocity slip angle and is configured and arranged to provide an "optimized" or enhanced ground roll course error signal:

$$\Delta\beta_{g0} = \Delta\beta_g + \text{sign}(V)K_0 \partial\dot{V}/\partial\beta_g$$

for $\partial\dot{V}/\partial\beta_g > 0$ and $$\Delta\beta_{g0} = \Delta\beta_g$$

for $\partial\dot{V}/\partial\beta_g \leq 0$ where $K_0$ is a preselected constant that is determined from the exact characteristics of the lateral force-ground slip angle characteristic for the aircraft of interest so as to control damping or overshoot of the peak force and $\partial\dot{V}/\partial\beta_g$ denotes the partial derivative of the aircraft lateral acceleration with respect to ground velocity slip angle.

Figure 9:
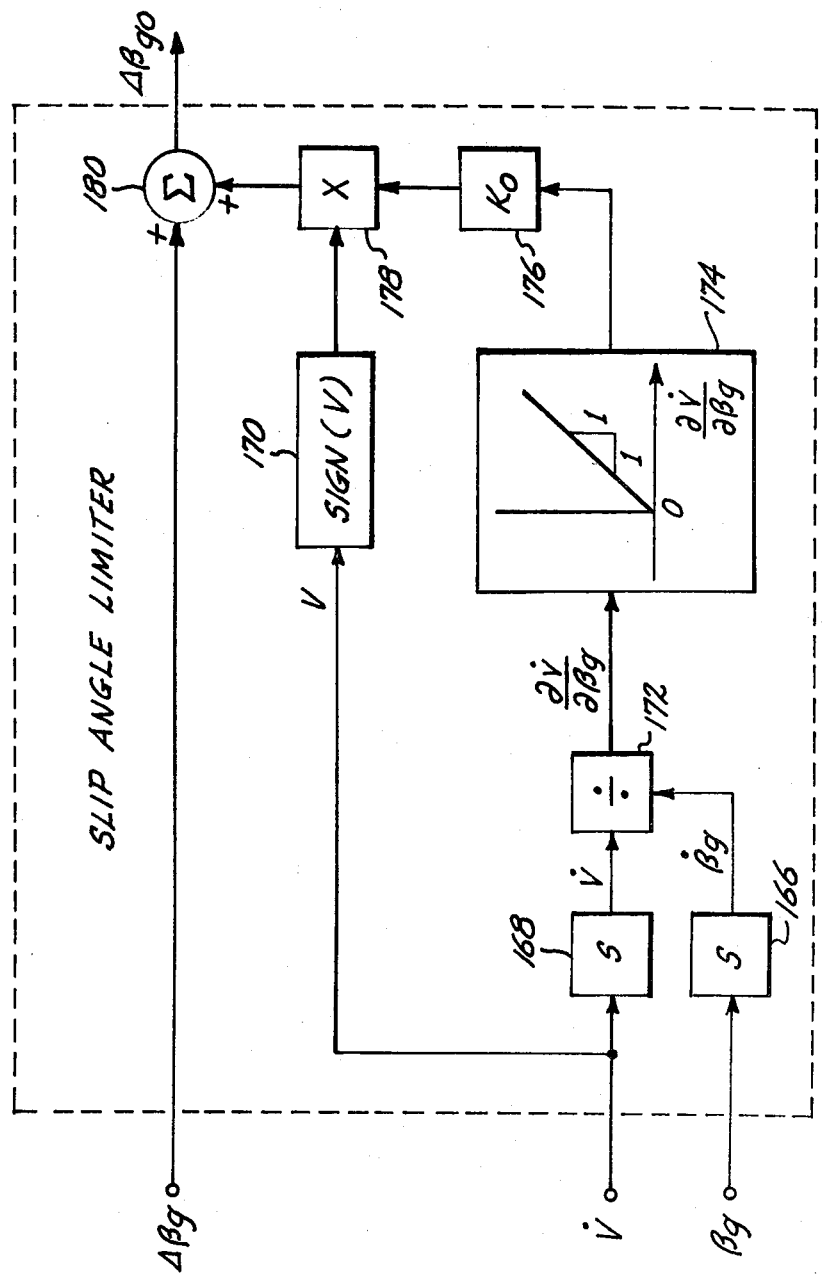
FIG. 9 is a control system diagram that depicts the signal processing utilized in the invention to limit the ground velocity slip angle of the aircraft to an angle that produces maximum lateral corrective force.

Both the operation of such a slip angle limiter and the structure of the signal processing apparatus required for its implementation can be more fully understood with reference to the control system diagram of FIG. 9. In the depicted arrangement, the aircraft inertial navigation system (26 in FIG. 2) supplies a signal representative of the current ground velocity slip angle $\beta_g$ to the input port of a differentiating network 166 and supplies a signal representative of the aircraft lateral velocity V to the input port of a second differentiating network 168 and to the input of a comparator unit 170. The signals provided by the differentiating networks 166 and 168 are coupled to the input ports of a divider unit 172, which supplies a signal substantially equal to the partial derivative of lateral acceleration with respect to ground velocity slip angle. This signal is coupled to a signal multiplier 176, via a limiter unit 174 which passes only positive signal values. Signal multiplier 176 exhibits a gain equal to the previously mentioned constant $K_0$ and supplies a signal representative of $K_0 \partial\dot{V}/\partial\beta_g$ to one input port of a second signal multiplier 178.

Comparator unit 170 is configured and arranged to supply a signal representative of $-1$ when the inertial navigation system supplies a negative lateral velocity signal and is arranged to supply a signal represetative of $+1$ when inertial navigation system 26 supplies a lateral velocity signal greater than zero. Since the output port of multiplier 178 is coupled to an input port of a summing unit 180, having the second input port thereof connected for receiving a signal representative of $\Delta\beta_g$ (supplied by course error computer 28 of FIG. 2), it can be recognized that summing unit 180 supplies a signal $\Delta\beta_{g0}$ which substantially corresponds to the above set forth, desired relationships.

Figure 10A:
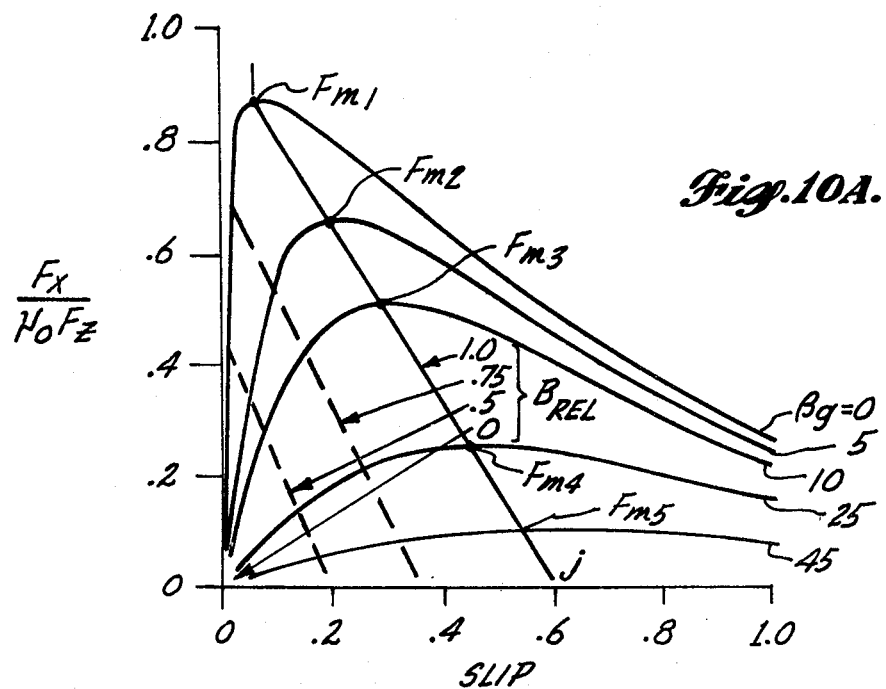
FIGS. 10a and 10b graphically illustrate characteristics of a conventional aircraft braking system and improvement in the generation of lateral corrective forces that can be obtained by reducing the amount of braking applied.

As was previously mentioned relative to slip angle limiter and brake relief unit 30 of the arrangement of FIG. 2 and the differential brake control described relative to FIG. 7, state of the art brake/antiskid systems are typically designed to produce maximum tire braking force relative to longitudinal axis of the aircraft and, thus, do not establish maximum corrective lateral force as a function of ground velocity slip angle $\beta_g$. More specifically, FIG. 10a depicts a series or family of characteristic curves which illustrate the longitudinal body axis braking force, $F_x$ (normalized with respect to vertical loading on the landing gear, $F_z$, and the coefficient of friction for the runway, $\mu_0$) as a function of tire slip S (a parameter defining the relationship between the actual and the snychronous wheel speeds) and for various constant values of ground velocity slip angle $\beta_g$. As can be seen from FIG. 10a, each longitudinal braking force-tire slip curve (i.e., each curve of constant ground velocity slip angle) exhibits a peak braking force ($F_{m1}$, $F_{m2}$, ..., $F_{m5}$) wherein the magnitude of the peak breaking force decreases relative to increased values of ground velocity slip angle $\beta_g$. As is also demonstrated by the depicted family of curves, the value of wheel slip that is associated with the peak longitudinal body axis braking force increases as a function of increased values of ground velocity slip angle $\beta_g$.

In terms of the above discussed braking characteristics, a state-of-the-art brake/antiskid system that is designed to cyclically operate the aircraft brakes to maximize longitudinal body axis tire braking force will ideally operate along a line segment that is defined by the above mentioned peak braking forces $F_{m1}, F_{m2}, ..., F_{m5}$ and is denoted by the line segment i-j in FIG. 10a. If the braking command is reduced or "relieved" by, in effect, multiplying the braking signal by a brake relief factor $B_{REL}$, where $0 < B_{REL} < 1$, a conventional brake/antiskid system will operate at a point on a line segment that is substantially parallel to the line segment i-j, with line segments indicating braking system operation for $B_{REL}=0.75, 0.5$ and $0.0$ being shown in FIG. 10a.

Figure 10B:
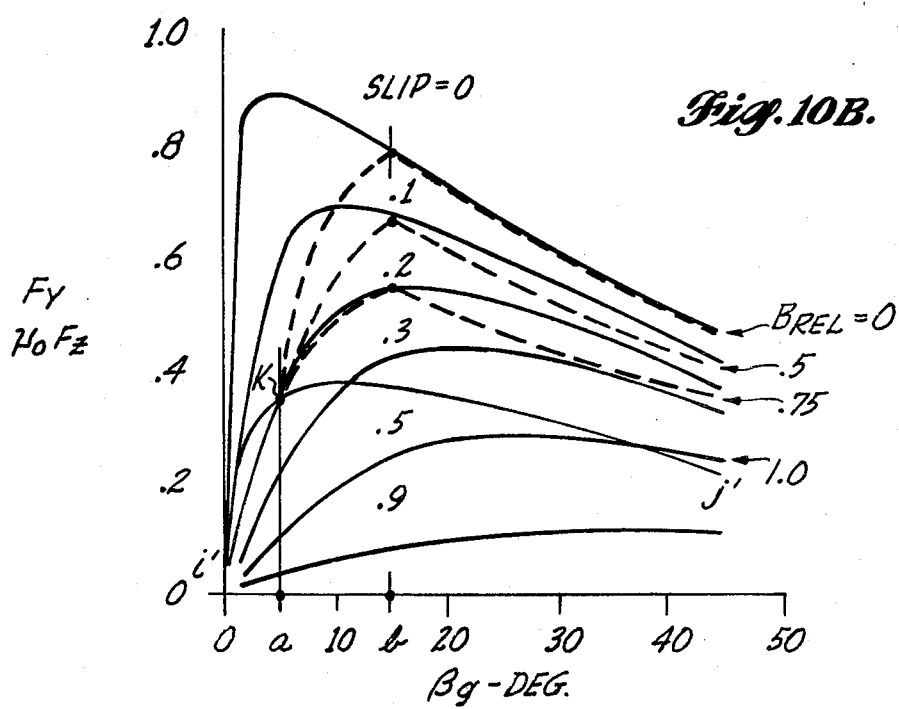

Turning to FIG. 10b, which depicts the lateral force characteristics that correspond to the longitudinal tire braking force curves of FIG. 10a, it can be noted that operation of the brake/antiskid system to optimize longitudinal braking force is not advantageous relative to developing maximum corrective lateral tire force by differential braking of the aircraft. In particular, each solid line curve of FIG. 10b, which illustrates the lateral force produced by the aircraft tire is a function of ground velocity slip angle and for a particular, noted value of wheel slip (normalized with respect to vertical loading and coefficient of friction), reaches a peak value at a relatively low value of ground velocity slip angle and then decreases so that less than maximum lateral force generation is attained for a relatively large portion of the depicted range of ground velocity slip angles. For example, the lateral force characteristic that corresponds to the optimal longitudinal braking force curve of FIG. 10a, (i.e., line segment i-j) is depicted in FIG. 10b as the curve extending between the points i' and j' and exhibits a peak lateral corrective force capability at a ground slip angle that is substantially less than 10 degrees. In many cases it will be desirable or necessary to configure the invention so that the range of ground velocity slip angles produced by operation thereof substantially exceeds the angle at which the associated brake/antiskid system establishes maximum lateral corrective force. In such cases it may be advantageous to reduce or relieve the braking signal in the manner depicted in FIG. 10a to obtain a substantial increase in the amount of available lateral corrective force. In particular, when the braking signal is reduced so that the brake/antiskid operates on one of the brake relief line segments depicted in FIG. 10a, the value of wheel slip decreases which in turn results in substantially improved lateral force generation characteristics (FIG. 10b). Thus, providing brake relief in the manner mentioned relative to describing the differential braking arrangement of FIG. 7 can substantially increase the lateral corrective force. Further, by comparing the longitudinal tire braking force characteristics and the lateral force characteristics depicted in FIGS. 10a and 10b it can be noted that substantial improvement in lateral force generation is often attained with only a relatively small attendent reduction in longitudinal braking force, especially for those values of ground velocity slip angle that exceed the value at which maximum lateral force is generated during normal operation of the brake/antiskid system (i.e., when $B_{REL}=1$). Thus, reducing or relieving the longitudinal body axis tire braking force to incre the corrective lateral tire force may not substantially lengthen the distance required for landing rollout and, in any case, since brake relief is only asserted by the invention when the aircraft cannot be satisfactorily controlled by means of the rudder and steering systems, compromising the length of the landing rollout is usually advisable so as to prevent the aircraft from sliding off the runway.

In accordance with this invention at least three techniques can be employed to realize arrangements for supplying a satisfactory brake relief signal and, hence, optimizing or enhancing the generation of the corrective later tire force when the invention asserts lateral control of the aircraft by means of brake relief.

Figure 11:
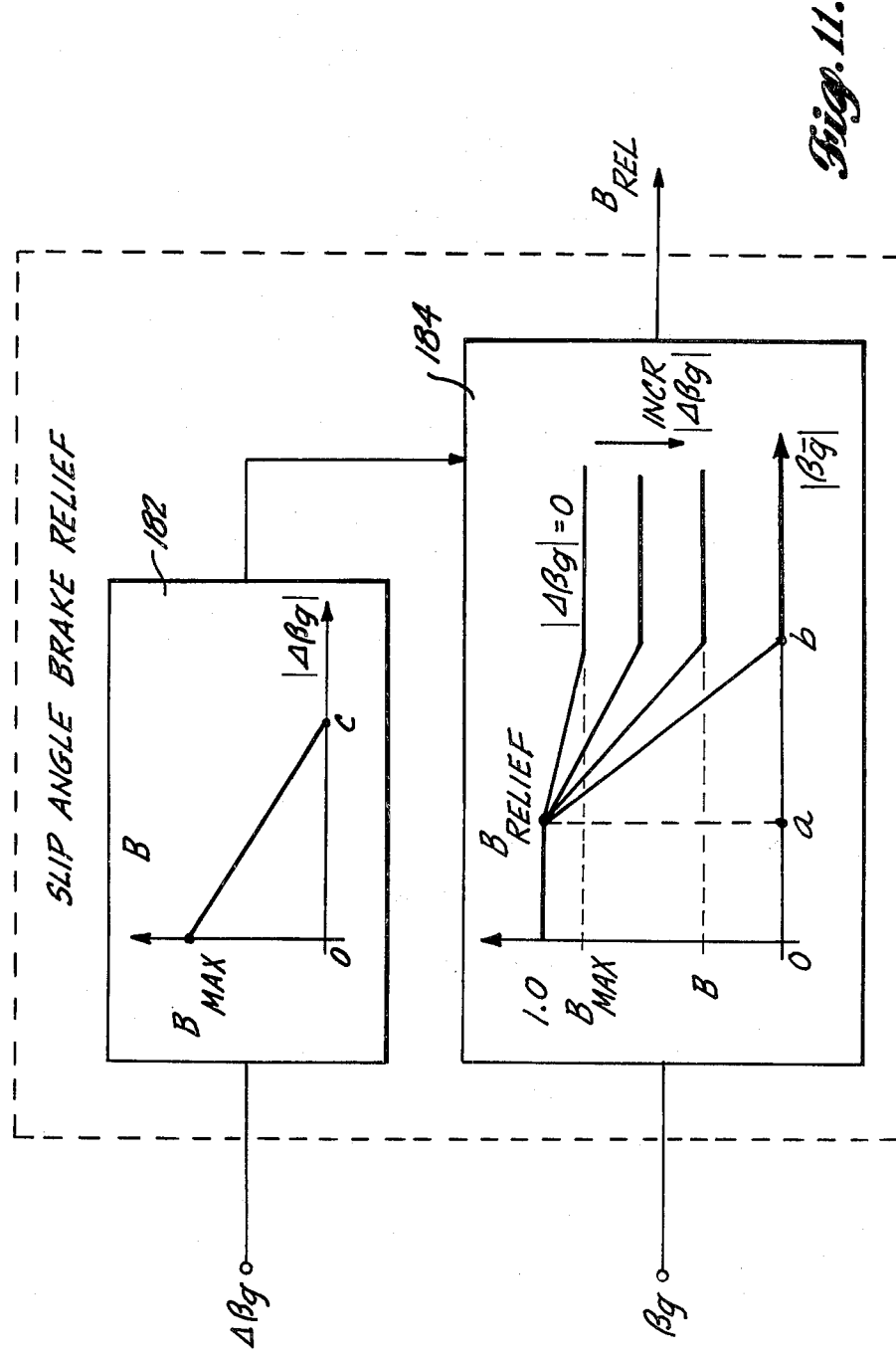
FIGS. 11, 12 and 13 are control system diagrams that illustrate three separate techniques and arrangements that can be utilized to generate a signal for reducing the aircraft braking command when such reduction will result in improved lateral corrective forces.

The first of the three currently utilized alternative arrangements can be understood with combined reference to the control system diagram of FIG. 11 and the lateral force characteristic curves of FIG. 10b and is configured to reduce the signal supplied to the aircraft brake/antiskid system only when: (a) the aircraft is at a ground velocity slip angle that exceeds the angle at which normal operation of the brake/antiskid system results in maximum lateral force capability; and (b) only when such an excessive ground velocity slip angle is accompanied by a large ground roll course error signal $\Delta\beta_g$. More specifically, in the signal processing arrangement of FIG. 11, the signal $\Delta\beta_g$, supplied by course error computer 28 of FIG. 2, is coupled to a signal processing unit 182, which is arranged or sequenced to supply a braking factor:

$B = 0$ for $|\Delta\beta_g| > C$ $B = B_{max}[1-(1/C)|\Delta\beta_g|]$ for $|\Delta\beta_g| \leq C$ Where $B_{max}$ is a predetermined constant and C is a predetermined ground velocity slip angle. As will be recognized by those skilled in the art, the indicated signal processing can be effected in a number of conventional manners, including by a simple sequence of logic and arithmetic operations in an embodiment of the invention that utilizes a sequential, programmable digital processor arrangement (e.g., a computer or a microprocessor) or by an arrangement including a comparator and other conventional circuitry in embodiments of the invention that are realized by discrete digital or analog circuit arrangements.

In any case, in the signal processing arrangement of FIG. 11, the braking factor B is applied to a signal processing unit 184, which is connected for receiving the signal representative of the current ground velocity slip angle $\beta_g$ and for supplying the brake relief signal $B_{REL}$ to the aircraft brake system (e.g., to signal multipliers 154 and 156 of the differential braking arrangement of FIG. 7). As is diagrammatically indicated in FIG. 11, the brake relief signal supplied by signal processing unit 184 is given by the expression:

$$B_{REL}=1$$

for $|\beta_g| \leq a$ $$B_{REL}=1-(1-B)(|B_g|-a)/(b-a)$$

for $a<|\beta_g|<b$ and $$B_{REL}=B$$

for $|\beta_g| \geq b$

Where B is the above defined braking factor; a is a preselected ground velocity slip angle, at which reduced braking (and, hence, improved lateral force generation) will begin; and b is a second predetermined ground velocity slip angle, which establishes the maximum amount of brake release produced by signal processing unit 184. Like signal processing unit 182, signal processing unit 184 can be realized by a sequence of logical and arithmetic operations that corresponds to the above relationship when the invention is embodied with a programmable, sequential digital processor and can be realized by comparators and other conventional circuitry in embodiments of the invention that employ dedicated logic or analog circuitry.

Operation of the brake relief arrangement of FIG. 11 can be understood with reference to FIG. 10b, wherein the above discussed predetermined ground velocity slip angle a is slightly less than the slip angle at which normal operation of the system (i.e., the $B_{REL}=1$ curve) produces peak lateral force and the above discussed predetermined ground velocity slip angle b is selected to be approxmately equal to 15 degrees. In this arrangement, the brake relief signal $B_{REL}$ is equal to 1 for all values of ground velocity slip angle than a and the corrective lateral tire force produced is determined by that portion of the $B_{REL}=1$ characteristic curve that lies between i' and the point thereon that is identified by the letter k. When the ground velocity slip angle $\beta_g$ exceeds a, the brake relief signal is determined by the current value of $\Delta\beta_g$ and $\beta_g$ in the manner indicated by the signal processing expressions for signal processing units 182 and 184. For example, depending on the ground roll course error signal $\Delta\beta_g$ and the system constant $B_{max}$ and C, operation of an arrangement configured in accordance with FIG. 11 over the ground velocity slip angle range between the points a and b might correspond to one of the three broken line curves (or to some other function that exhibits decreased wheel slip and increased corrective lateral tire force). As previously mentioned and as is also illustrated by FIG. 10b, the brake release signal provided by the arrangement of FIG. 11 remains constant for all ground velocity slip angles greater than b and, thus, maximum corrective lateral tire force is generated when the aircraft ground velocity slip angle is substantially equal to b.

Figure 12:
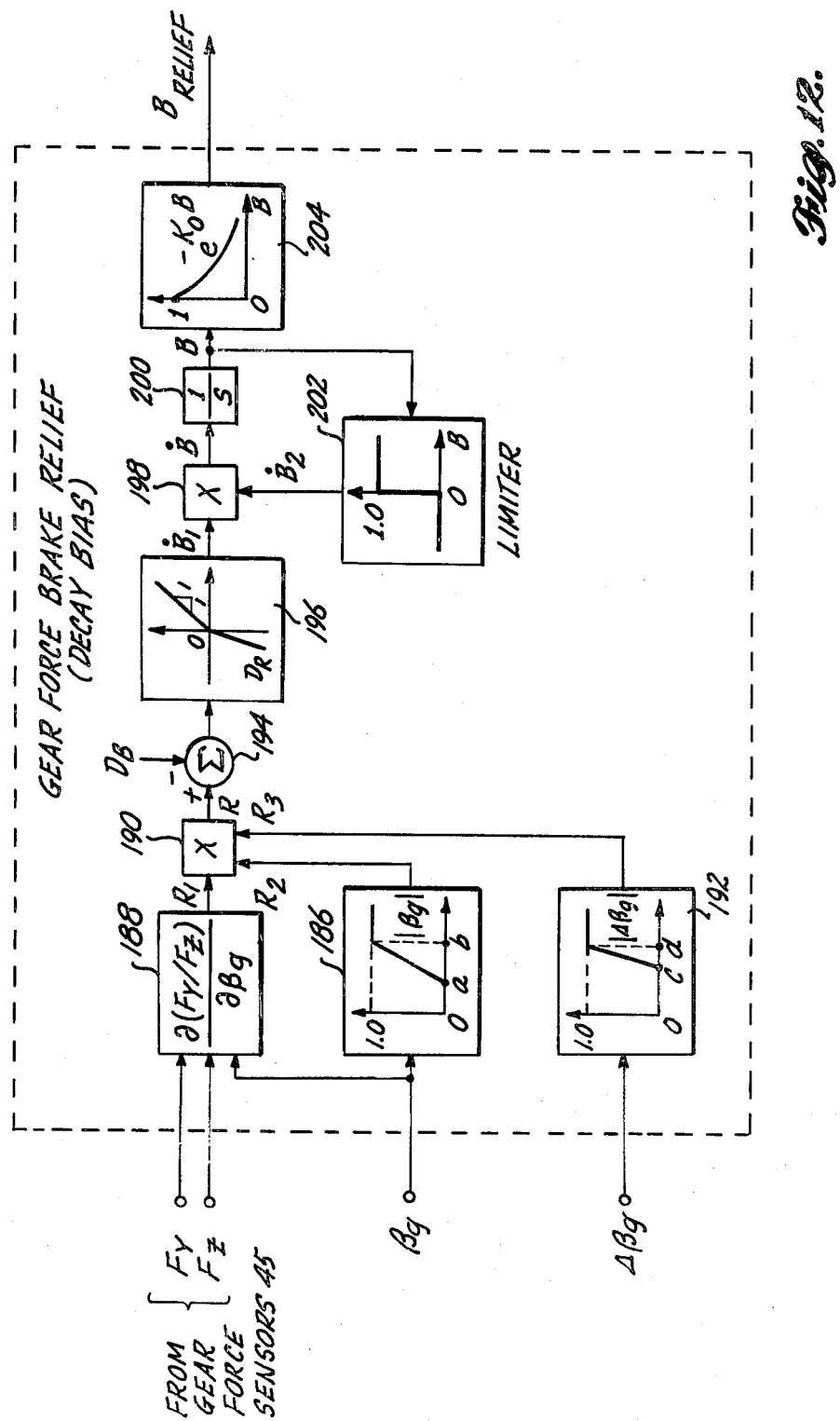

An alternative arrangement that provides substantially similar generation of a brake release signal based on signals representative of the vertical loading ($F_z$) and lateral force ($F_y$) exerted on the aircraft landing gear is illustrated by the control system diagram of FIG. 12. In this arrangement, a signal that is based on the vertical and lateral forces exerted on the landing gear, the current value of ground velocity slip angle ($\beta_g$) and the ground roll course error ($\Delta\beta_g$) is combined with an applied bias or reference signal and supply to an integral control system which provides a brake relief signal $B_{REL}$ of the form $e^{-K_0B}$. More specifically, in the arrangement of FIG. 12, a signal representative of the current ground velocity slip angle $\beta_g$ is supplied to a signal processing unit 186 and to a signal processing unit 188, which also receives signals representative of the vertical load on the aircraft landing gear ($F_z$) and the lateral force exerted on the landing gear ($F_y$). As is indicated, signal processing unit 188 supplies a signal $R_1$ to one input port of a signal multiplier 190, with $R_1$ being substantially equal to the partial derivative of the normalized lateral force ($F_y/F_z$) with respect to ground velocity slip angle $\beta_g$. As was described relative to the arrangement of FIG. 9, such a signal can be derived by utilizing conventional techniques and apparatus for signal differentiation and division.

Continuing with the description of the control system diagram of FIG. 12, signal processing unit 186 supplies a signal $R_2$ to a second input port of signal multiplier 190 where, as is indicated, $$R_2=0$$

for $|\beta_g| \leq a$ $$R_2=(|\beta_g|-a)/(b-a)$$

for $a<|\beta_g|<b$ and $$R_2=1.0$$

for $|\beta_g| \leq b$ with a and b being established in the same manner as was described relative to the brake release arrangement of FIG. 11. In addition, a signal processing unit 192, which receives a signal representative of the ground roll course error $\Delta\beta_g$, couples a third input signal $R_3$ to signal multiplier 190, with $$R_3=0$$

for $|\Delta\beta_g| \leq c$ $$R_3=(|\Delta\beta_g|-c)/(d-c)$$

for $c<|\Delta\beta_g|<d$ and $$R_3 = 1$$

for $|\Delta\beta_g| \leq d$ where c and d are predetermined values of ground roll course error.

In view of the signal characteristics of $R_1$, $R_2$ and $R_3$, it can be recognized that signal multiplier 190 supplies a nonzero signal to the input port of a summing unit 194 only when the absolute value of the ground velocity slip angle ($\Delta\beta_g$) is greater than a and the absolute value of the ground roll course error ($\Delta\beta_g$) is greater than c. Since summing unit 194 is arranged to supply a signal substantially equal to $R-D_B$ (where $D_B$ is an applied bias signal) to a signal processing unit 196 which, as is indicated in FIG. 12, exhibits unity gain for all positive value input signals and a relatively high gain ($D_R$) for all negative inputs, it can be recognized that a relatively large negative signal $\dot{B}_1 = D_R(R-D_B)$ will be supplied by signal processing unit 196 whenever $(R-D_B)<0$ and a signal $\dot{B}_1$ that is substantially identical to $(R-D_B)$ will be supplied whenver $(R-D_B) \geq 0$.

With continued reference to FIG. 12, the signal supplied by signal processing unit 196 is coupled to a multiplier 198 having the output thereof connected to the input port of an integrater unit 200. Since the output signal of integrater 200 is fed back to a second input port of multiplier 198 via a limiter 202 and since limiter 202 exhibits a gain of zero for all negative feedback signals and a gain of unity for all positive feedback signals, it can be shown that the signal B that is supplied by integrater 200 will rapidly become zero whenever the amplitude of $R_1$ (i.e., the combined gear force-ground velocity slip angle-ground roll course error signal) is less than the applied bias $D_B$. On the other hand, when R exceeds $D_B$, $B = \dot{B}$ (1/s). Since, as was previously mentioned and as is indicated by a signal processing unit 204 in FIG. 12, the brake relief signal $B_{REL} = e^{-(K_0B)}$, it can be recognized that the depicted arrangement produces brake relief (i.e., $B_{REL}$ less than unity) only when the lateral corrective force being generated by means of differential braking exceeds the peak lateral force capability (i.e., only when the partial derivative of $(F_y/F_z)$ with respect to $\beta_g$ is positive and $\beta_g$ and $\Delta\beta_g$ exceed the previously discussed thresholds a and b, respectively.

Figure 13:
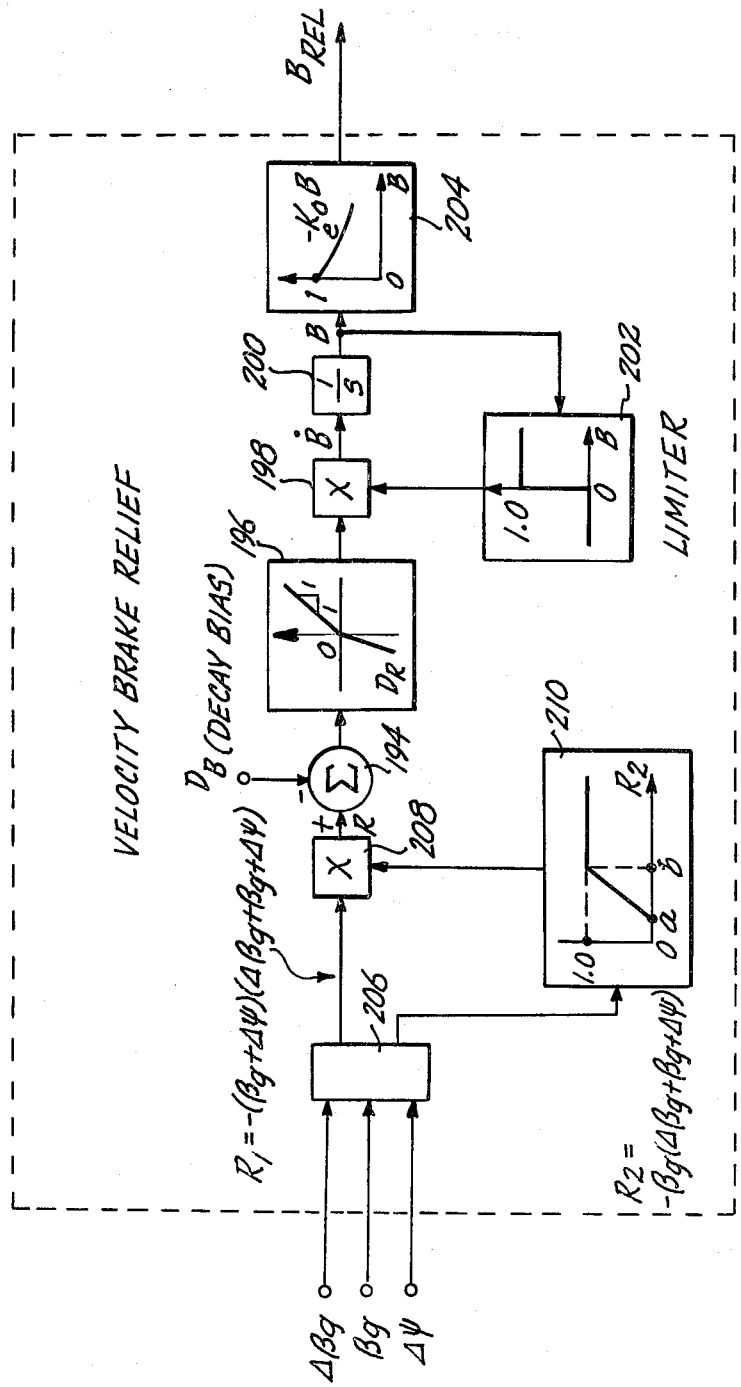

The control signal diagram of FIG. 13 illustrates a third alternative technique and arrangement for developing a brake relief signal $B_{REL}$ which increases the corrective lateral tire force relative to the force that can be attained with an identical conventional brake/antiskid system. As can be seen from FIG. 13, the depicted utilizes a brake relief signal of the form $B_{REL} = e^{-K_0B}$ which is supplied by an integral controller that is responsive to a signal $(R-D_B)$ and is identical to the integral controller portion of the arrangement of FIG. 12. Thus, the brake relief factor B is given by the expression $$B = \dot{B}_1 \dot{B}_2 (1/s)$$

where $\dot{B}_1 = (R-D_B)$ for $(R-D_B) > 0$ $\dot{B}_1 = D_R(R-D_B)$ for $(R-D_B) < 0$ and where $\dot{B}_2 = 1$ for $\dot{B} > 0$ $\dot{B}_2 = 0$ for $\dot{B} < 0$ The arrangement of FIG. 13 differs from the arrangement of FIG. 12 in that the control signal R of FIG. 13 is established so as to provide brake relief whenever: (a) the product of the distance between the runway centerline and the aircraft multiplied by the time rate of change in that distance is greater than zero ($Y\dot{Y}>0$); and (b) simultaneously therewith the product of the distance between the runway centerline and the aircraft multiplied by the current ground velocity slip angle is greater than zero. ($Y\beta_g > 0$). These conditions basically mean that brake relief will be established if the aircraft is moving away from the aircraft centerline and the sign of the ground velocity slip angle $\beta_g$ is such that reduction of the braking force will establish a force that resists the undesired outward lateral movement of the aircraft.

Although various signal processing arrangements can be utilized to provide signals representative of Y and $\dot{Y}$, the arrangement of FIG. 13 is based on a direct proportionality between Y and the quantity $-(\Delta\beta_g + \beta_g + \Delta\psi)$ and a direct proportionality between $\dot{Y}$ and the quantity $(\beta_g + \Delta\psi)$. More specifically, the control system diagram of FIG. 13 includes a signal processing unit 206 which receives signals representative of $\beta_g$, $\Delta\beta_g$ and $\Delta\psi$. As is indicated in the drawing, signal processing unit 206 supplies a first output signal $R_1 = -(\beta_g + \Delta\psi)(\Delta\beta_g + \beta_g + \Delta\psi)$, which is representative of $Y\dot{Y}$ and supplies a second output signal $R_2 = -\beta_g(\beta_g + \Delta\beta_g + \Delta\psi)$, which is representative of $Y\beta_g$. To configure the arrangement so that a brake relief signal is only produced for ground velocity slip angles above a predetermined level, the signal $R_1$ is coupled to a first input port of a signal multiplier 208 and the signal $R_2$ is coupled to the second input terminal of multipler 208 via a signal processing unit having a transfer characteristic that is substantially equal to zero for all values of $R_2$ less than a; is equal to $(R_2-a)/(b-a)$ when $R_2$ is greater than a and less than b; and is equal to 1 for $R_2$ greater than or equal to b.

Those skilled in the art will recognize that the embodiments of the invention disclosed herein are exemplary in nature and that various changes can be made therein without departing from the scope and the spirit of the invention. In this regard and as was previously mentioned, the invention is readily embodied with either analog or digital circuit arrangements with the control system diagrams and description contained herein being used to realize the associated digital or analog circuitry and being directly transformable into a computer program or firmware for practicing the invention in the currently preferred form of a computer or microprocessor based system. Further, it will be recognized the various devices other than the aircraft rudder pedals can be utilized to provide the signal representative of the desired direction of travel when the invention is operated in the herein discussed semiautomatic mode. Because of the above and numerous other variations and modifications that will occur to those skilled in the art, the following claims should not be limited to the embodiments illustrated and discussed herein.

The embodiments of the invention in which an exclusive property or privilege is claimed is defined as follows:

1. Ground roll control apparatus for lateral control of an aircraft during execution of the landing rollout sequence on a runway, said aircraft being of the type that includes a rudder system for aerodynamically establishing lateral control, at least one steerable wheel for exerting lateral control and a braking system with left and right differentially operable left and right brakes for providing additional lateral control, said aircraft being equipped with means for supplying signals representative of the current yaw position of said aircraft, the time rate of change of said current yaw position of said aircraft, the current ground velocity slip angle of said aircraft and the velocity of said aircraft relative to the longitudinal and lateral body axis thereof, said ground roll control apparatus comprising:

course error computation means for supplying a ground roll course error signal representative of the difference between the current trajectory of said aircraft and a desired trajectory that will maintain said aircraft within the lateral boundaries of said runway;

steering controller means for supplying a steering control signal for operating the steerable wheels of said aircraft, said steering controller means including integral control means for supplying a first component of said steering control signal, said integral control means being responsive to said ground roll course error signal, said signal representative of the current ground velocity slip angle of said aircraft and said signal representative of said current yaw position of said aircraft, said steering controller further including proportional control means for supplying a second component of said steering control signal, said proportional control means being responsive to said ground roll course error signal and said signal representative of the time rate of change in said current yaw position of said aircraft, said steering controller means further including means for combining said first and second components of said steering control signal to produce said steering control signal;

rudder controller means for supplying a rudder control signal for operating said rudder system of said aircraft, said rudder controller means including integral control means for supplying a first component of said rudder control signal, said integral control means being responsive to said ground roll course error signal, said signal representative of the current ground velocity slip angle of said aircraft and said signal representative of the current yaw position of said aircraft, said rudder controller means further including proportional control means for supplying a second component of said rudder control signal, said proportional control means being responsive to said ground roll course error signal and said signal representative of the time rate of change in said current yaw position of said aircraft, said rudder control means further including means for combining said first and second components of said rudder control signal, said rudder controller means additionally including rudder authority means for receiving said combined first and second components of said rudder control signal and for supplying said rudder control signal, said rudder authority means exhibiting a gain factor that is a function of the ground roll velocity of said aircraft to supply said rudder control signal at a level that causes said rudder system to provide lateral control that dominates the lateral control provided by said steerable wheels and said braking system during a predetermined high speed portion of said landing rollout sequence; and differential brake controller means for supplying a brake control signal for operating said differentially operable left and right brakes of said aircraft, said differential brake controller means being responsive to said ground roll course error signal and said signal representative of the time rate of change in said current yaw position of said aircraft to selectively reduce one of the pilot-initiated left and right brake signals by an amount proportional to a weighted sum of said signal representative of said ground roll course error signal and said signal representative of said time rate of change in said current yaw position of said aircraft.

2. The ground roll control apparatus of claim 1 wherein said steering controller means includes a signal limiting means for limiting said steering control signal to said steerable wheels to a maximum level no greater than that signal level at which said steerable wheels develop maximum lateral force on said aircraft.

3. The ground roll control apparatus of claim 2 further comprising means for selectively supplying a runway condition signal to said signal limiting means of said steering controller means, said runway condition signal being selectively established to represent the maximum expected coefficient of friction of said runway; said signal limiting means of said steering controller means including means for establishing said maximum level of said steering control signal at a limiting level that is a function of said runway condition signal.

4. The ground roll control apparatus of claim 3 wherein said signal limiting means includes means for establishing said limiting level substantially equal to $A\mu_0 + B$, where A and B are predetermined real numbers and $\mu_0$ denotes the maximum expected coefficient of friction of said predetermined runway.

5. The ground roll control apparatus of claim 1 wherein said differentially operable left and right brakes are controlled by force-activated brake pedals which supply pilot-initiated left and right brake signals and wherein said differential brake controller means includes means for equalizing the pilot-initiated brake signal supplied to said left and right brakes and means for then selectively reducing one of said pilot-initiated left and right brake signals to provide said brake control signal.

6. The ground roll control apparatus of claims 1, 2, 3, 4 or 5 wherein said first component of said steering control signal supplied by said integral control means of said steering controller means is of the form $K_{BS} \Delta\beta_g + K_{PS} \Delta\psi$, where $K_{BS}$ is a scale factor, $\Delta\beta_g$ denotes said ground roll course error signal, $K_{PS}$ is a predetermined constant, and $\Delta\psi$ denotes said time rate of change in said yaw position of said aircraft; and wherein said second component of said steering control signal supplied by said integral control means of said steering controller means is of the form $C_{IS}K_{BS}(1/s)(\Delta\beta_g + \beta_g + \Delta\psi)$, where $C_{IS}$ is a predetermined constant, $\beta_g$ denotes said current ground velocity slip angle of said aircraft, $\Delta\psi$ represents said current yaw position of said aircraft and s denotes the Laplacian operator.

7. The ground roll control apparatus of claim 6 wherein said scale factor $K_{BS}$ is a monotonically increasing function of the ground roll velocity of said aircraft.

8. The ground roll control apparatus of claim 6 wherein said course error computation means includes means responsive to said signals representative of said longitudinal and lateral body axis velocities of said aircraft for establishing said signal representative of said current ground velocity slip angle substantially equal to arctan (V/U), where V and U respectively represents said lateral and longitudinal body axis velocities of said aircraft; said course error computation means further including means for subtracting said signal representative of said current ground velocity slip angle from a signal representative of a desired ground velocity slip angle and for supplying the resulting signal as said signal representative of the difference between said current trajectory of said aircraft and said desired trajectory; said ground roll control apparatus further comprising manual-operable means for supplying said signal representative of said desired ground velocity slip angle.

9. The ground roll control apparatus of claim 8 further comprising slip angle limiting means for modifying said signal representative of said difference between said desired ground velocity slip angle and said current ground velocity slip angle to prevent said rudder controller means, said steering controller means and said brake controller means from providing rudder, steering and brake control signals, respectively, that would result in a ground velocity slip angle that exceeds the ground velocity slip angle associated with peak lateral corrective force on said aircraft.

10. The ground roll control apparatus of claim 9 wherein said slip angle limiting means includes:
means responsive to said signal representative of said lateral body axis velocity of said aircraft and said signal representative of said current ground velocity slip angle of said aircraft for supplying a signal representative of the derivative of the lateral body axis velocity of said aircraft relative to ground velocity slip angle; and
means responsive to said signal representative of said difference between said desired ground velocity slip angle and said current ground velocity slip angle for reducing the magnitude thereof by an amount substantially equal to the magnitude of said signal representative of the derivative of said lateral body axis velocity of said aircraft relative to ground velocity slip angle.

11. The ground control apparatus of claim 6 wherein said course error computation means includes:
means responsive to a signal representative of the heading of said runway, said signal representative of said current yaw angle of said aircraft and said signals representative of said longitudinal and lateral body axis velocities of said aircraft for supplying a signal representative of the distance between said aircraft and the centerline of said runway;
means for establishing said signal representative of said desired trajectory substantially equal to arctan $(Y/\bar{x} - \Delta\psi)$, where Y represents said signal representative of the distance between said aircraft and said runway centerline, $\bar{x}$ is a predetermined system constant and $\Delta\psi$ represents the difference between said signal representative of said current yaw position of said aircraft and said signal representative of said heading of said runway;
means for establishing said signal representative of said current ground velocity slip angle substantially equal to arctan (V/U), where V and U respectively represent said lateral and longitudinal body axis velocities of said aircraft; and
means for subtracting said signal representative of said current ground velocity slip angle from said signal representative of said desired trajectory of said aircraft;
said ground roll control apparatus further comprising manually operable means for supplying a selectable signal representative of said heading of said runway.

12. The ground roll control apparatus of claim 11 further comprising slip angle limiting means for modifying said signal representative of said difference between said desired ground velocity slip angle and said current ground velocity slip angle to prevent said rudder controller means, said steering controller means and said brake controller means from providing rudder, steering and brake control signals, respectively, that would result in a ground velocity slip angle that exceeds the ground velocity slip angle associated with peak lateral corrective force on said aircraft.

13. The ground roll control apparatus of claim 12 wherein said slip angle limiting means includes;
means responsive to said signal representative of said lateral body axis velocity of said aircraft and said signal representative of said current ground velocity slip angle of said aircraft for supplying a signal representative of the derivative of the lateral body axis velocity of said aircraft relative to ground velocity slip angle; and
means responsive to said signal representative of said difference between said desired ground velocity angle and said current ground velocity slip angle for reducing the magnitude thereof by an amount substantially equal to the magnitude of said signal representative of the derivative of said lateral body velocity of said aircraft relative to ground velocity slip angle.

14. The ground roll control apparatus of claims 1, 2, 3, 4 or 5 wherein said second component of said rudder control signal supplied by said proportional control means of said rudder control means is of the form $K_{BR} \Delta\beta_g + K_{PR} \Delta\psi$, where $K_{BR}$ is a scale factor $\Delta\beta_g$ represents said ground roll course error signal, $K_{PR}$ is a predetermined constant and $\Delta\dot\psi$ represents said signal representative of said time rate of change in said current yaw position of said aircraft; and wherein said first component of said rudder control signal supplied by said integral control means of said rudder controller means is of the form $C_{IR}K_{BR}(1/s)(\Delta\beta_g + \beta_g + \Delta\psi)$, where $C_{IR}$ is a predetermined constant, $\beta_g$ represents said current ground velocity slip angle of said aircraft, $\Delta\psi$ denotes said current yaw position of said aircraft and s is the Laplacian operator.

15. The ground roll control apparatus of claim 14 wherein said scale factor $K_{BR}$ is a function of the ground roll velocity of said aircraft.

16. The ground roll control apparatus of claim 14 wherein said course error computation means inclues means responsive to said signals representative of said longitudinal and lateral body axis velocities of said aircraft for establishing said signal representative of said current ground velocity slip angle substantially equal to arctan (V/U), where V and U respectively represents said lateral and longitudinal body axis velocities of said aircraft; said course error computation means further including means for subtracting said signal representative of said current ground velocity slip angle from a signal representative of a desired ground velocity slip angle and for supplying the resulting signal as said signal representative of the difference between said current trajectory of said aircraft and said desired trajectory; said ground roll control apparatus further comprising manual-operable means for supplying said signal representative of said desired ground velocity slip angle.

17. The ground roll control apparatus of claim 16 further comprising slip angle limiting means for modifying said signal representative of said difference between said desired ground velocity slip angle and said current ground velocity slip angle to prevent said rudder controller means, said steering controller means and said brake controller means from providing rudder, steering and brake control signals that would result in a ground velocity slip angle that exceeds the ground velocity slip angle associated with peak lateral corrective force on said aircraft.

18. The ground roll control apparatus of claim 17 wherein said slip angle limiting means includes:
means responsive to said signal representative of said lateral body axis velocity of said aircraft and said signal representative of said current ground velocity slip angle of said aircraft for supplying a signal representative of the derivative of the lateral body axis velocity of said aircraft relative to ground velocity slip angles, and
means responsive to said signal representative of said difference between said desired ground velocity slip angle and said current ground velocity slip angle for reducing the magnitude thereof by an amount substantially equal to the magnitude of said signal representative of the derivative of said lateral body axis velocity of said aircraft relative to ground velocity slip angle.

19. The ground control apparatus of claim 14 wherein said course error computation means includes;
means responsive to a signal representative of the heading of said runway, said signal representative of said current yaw angle of said aircraft and said signals representative of said longitudinal and lateral body axis velocities of said aircraft for supplying a signal representative of the distance between said aircraft and the centerline of said runway;
means for establishing said signal representative of said desired trajectory substantially equal to arctan $(Y/\bar{x} - \Delta\psi)$, where Y represents said signal representative of the distance between said aircraft and said runway centerline, $\bar{x}$ is a predetermined system constant and $\Delta\psi$ represents the difference between said signal representative of said current yaw position of said aircraft and said signal representative of said heading of said runway;
means for establishing said signal representative of said current ground velocity slip angle substantially equal to arctan (V/U, where V and U respectively represent said lateral and longitudinal body axis velocities of said aircraft; and
means for subtracting said signal representative of said current ground velocity slip angle from said signal representative of said desired trajectory of said aircraft;
said ground roll control apparatus further comprising manually operable means for supplying a selectable signal representative of said heading of said runway.

20. The ground roll control apparatus of claim 19 further comprising slip angle limiting means for modifying said signal representative of said difference between said desired ground velocity slip angle and said current ground velocity slip angle to prevent said rudder controller means, said steering controller means and said brake controller means from providing rudder, steering and brake control signals that would result in a ground velocity slip angle that exceeds the ground velocity slip angle associated with peak lateral corrective force on said aircraft.

21. The ground roll control apparatus of claim 20 wherein said slip angle limiting means includes;
means responsive to said signal representative of said lateral body axis velocity of said aircraft and said signal representative of said current ground velocity slip angle of said aircraft for supplying a signal representative of the derivative of the lateral body axis velocity of said aircraft relative to ground velocity slip angle; and
means responsive to said signal representative of said difference between said desired ground velocity angle and said current ground velocity slip angle for reducing the magnitude thereof by an amount substantially equal to the magnitude of said signal representative of the derivative of said lateral body velocity of said aircraft relative to ground velocity slip angle.

22. The ground roll control apparatus of claims 1, 2, 3, 4 or 5 wherein said differential brake controller means includes means for selectively supplying one of said left and right brakes with a signal of the form $1/(1+(|B|-1)K_{AB})$ multiplied by the current value of said pilot-initiated brake signal, where $K_{AB}$ is a scale factor and B is substantially equal to $K_{BB}\Delta\beta_g + K_{PB}\Delta\psi$, with $K_{BB}$ and $K_{PB}$ being predetermined constants, $\Delta\beta_g$ being representative of said ground roll course error signal and $\Delta\psi$ being representative of said time rate of change in said current yaw position of said aircraft.

23. The ground roll control apparatus of claim 22 wherein said scale factor $K_{AB}$ is a function of the ground roll velocity of said aircraft that monotonically decreases for all values of said ground roll velocity that exceed a predetermined velocity.

24. The ground roll control apparatus of claim 22 wherein said course error computation means includes means responsive to said signals representative of said longitudinal and lateral body axis velocities of said aircraft for establishing said signal representative of said current ground velocity slip angle substantially equal to arctan (V/U), where V and U respectively represents said lateral and longitudinal body axis velocities of said aircraft; said course error computation means further including means for subtracting said signal representative of said current ground velocty slip angle from a signal representative of a desired ground velocity slip angle and for supplying the resulting signal as said signal representative of the difference between said current trajectory of said aircraft and said desired trajectory; said ground roll control apparatus further comprising manual-operable means for supplying said signal representative of said desired ground velocity slip angle.

25. The ground roll control apparatus of claim 24 further comprising slip angle limiting means for modifying said signal representative of said difference between said desired ground velocity slip angle and said current ground velocity slip angle to prevent said rudder controller means, said steering controller means and said brake controller means from providing rudder, steering and brake control signals that would result in a ground velocity slip angle that exceeds the ground velocity slip angle associated with peak lateral corrective force on said aircraft.

26. The ground roll control apparatus of claim 25 wherein said slip angle limiting means includes:
means responsive to said signal representative of said lateral body axis velocity of said aircraft and said signal representative of said current ground velocity slip angle of said aircraft for supplying a signal representative of the derivative of the lateral body axis velocity of said aircraft relative to ground velocity slip angle, and
means responsive to said signal representative of said difference between said desired ground velocity slip angle and said current ground velocity slip angle for reducing the magnitude thereof by an amount substantially equal to the magnitude of said signal representative of said derivative of said lateral body axis velocity of said aircraft relative to ground velocity slip angle.

27. The ground control apparatus of claim 22 wherein said course error computation means includes;
means responsive to a signal representative of the heading of said runway, said signal representative of said current yaw angle of said aircraft and said signals representative of said longitudinal and lateral body axis velocities of said aircraft for supplying a signal representative of the distance between said aircraft and the centerline of said runway;
means for establishing said signal representative of said desired trajectory substantially equal to arctan $(Y/\bar{x} - \Delta\psi$, where Y represents said signal representative of the distance between said aircraft and said runway centerline, $\bar{x}$ is a predetermined system constant and $\Delta\psi$ represents the difference between said signal representative of said current yaw position of said aircraft and said signal representative of said heading of said runway;
means for establishing said signal representative of said current ground velocity slip angle substantially equal to arctan (V/U, where V and U respectively represent said lateral and longitudinal body axis velocities of said aircraft; and
means for subtracting said signal representative of said current ground velocity slip angle from said signal representative of said desired trajectory of said aircraft;
said ground roll control apparatus further comprising manually operable means for a selectable signal representative of said heading of said runway.

28. The ground roll control apparatus of claim 27 further comprising slip angle limiting means for modifying said signal representative of said difference between said desired ground velocity slip angle and said current ground velocity slip angle to prevent said rudder controller means, said steering controller means and said brake controller means from providing rudder, steering and brake control signals that would result in a ground velocity slip angle that exceeds the ground velocity slip angle associated with peak lateral corrective force on said aircraft.

29. The ground roll control apparatus of claim 28 wherein said slip angle limiting means includes;
means responsive to said signal representative of said lateral body axis velocity of said aircraft and said signal representative of said current ground velocity slip angle of said aircraft for supplying a signal representative of the derivative of the lateral body axis velocity of said aircraft relative to ground velocity slip angle; and
means responsive to said signal representative of said difference between said desired ground velocity angle and said current ground velocity slip angle for reducing the magnitude thereof of by an amount substantially equal to the magnitude of the derivative of said signal representative of said lateral body velocity of said aircraft relative to ground velocity slip angle.

* * * * *

UNITED STATES PATENT AND TRADEMARK OFFICE
CERTIFICATE OF CORRECTION

PATENT NO. : 4,482,961

DATED : November 13, 1984

INVENTOR(S) : Jerome R. Kilner et al

It is certified that error appears in the above-identified patent and that said Letters Patent is hereby corrected as shown below:

Column 25, line 55, insert --less-- before than
Column 26, line 53, " $\leq$ " should be -- $\geq$ --
Column 27, line 5, " $\leq$ " should be -- $\geq$ --

Signed and Sealed this

Ninth Day of July 1985

[SEAL]

Attest:

DONALD J. QUIGG

*Attesting Officer*     *Acting Commissioner of Patents and Trademarks*